(12) United States Patent
Chi et al.

(10) Patent No.: US 8,567,192 B2
(45) Date of Patent: Oct. 29, 2013

(54) SYSTEM FOR CONTROLLING AN AIR HANDLING SYSTEM INCLUDING A DUAL-STAGE VARIABLE GEOMETRY TURBOCHARGER

(75) Inventors: John N. Chi, Dubuque, IA (US); John M. Mulloy, Columbus, IN (US); Sriram S. Popuri, Greenwood, IN (US); Timothy R. Frazier, Columbus, IN (US); Martin T. Books, Columbus, IN (US); Divakar Rajamohan, Columbus, IN (US); Indranil Brahma, Bloomington, IN (US); Xi Wei, Asbury, IA (US)

(73) Assignee: Cummins, Inc., Columbus, IN (US)

( * ) Notice: Subject to any disclaimer, the term of this patent is extended or adjusted under 35 U.S.C. 154(b) by 152 days.

(21) Appl. No.: 13/244,556

(22) Filed: Sep. 25, 2011

(65) Prior Publication Data
US 2013/0074492 A1    Mar. 28, 2013

(51) Int. Cl.
*F02B 33/44*    (2006.01)
*F02B 33/00*    (2006.01)
*F02D 23/00*    (2006.01)

(52) U.S. Cl.
USPC .............................. 60/612; 60/602; 123/562

(58) Field of Classification Search
USPC .................... 60/602, 612; 123/562
See application file for complete search history.

(56) References Cited

U.S. PATENT DOCUMENTS

| | | | |
|---|---|---|---|
| 6,311,493 B1 * | 11/2001 | Kurihara et al. | 60/600 |
| 7,735,320 B2 * | 6/2010 | Yanakiev | 60/602 |
| 2010/0300087 A1 * | 12/2010 | Liu et al. | 60/602 |
| 2011/0016862 A1 * | 1/2011 | Song et al. | 60/602 |

* cited by examiner

*Primary Examiner* — Thomas Denion
*Assistant Examiner* — Ngoc T Nguyen
(74) *Attorney, Agent, or Firm* — Barnes & Thornburg LLP

(57) ABSTRACT

A system is provided for controlling an air handling system for an internal combustion engine. A dual-stage turbocharger includes a high-pressure compressor and variable geometry turbine combination fluidly coupled to a low-pressure compressor and variable geometry turbine combination. A control circuit includes a memory having instructions stored therein that are executable by the control circuit to determine a target low-pressure compressor ratio, a target high-pressure compressor ratio, a target high-pressure compressor inlet temperature and a target high-pressure compressor inlet pressure as a function of a target outlet pressure of the high-pressure compressor and a temperature, a pressure and a target flow rate of air entering the air inlet of the low-pressure compressor, and to control the geometries of the low-pressure and high-pressure turbines as a function of the target low-pressure compressor ratio the target high-pressure compressor ratio respectively.

20 Claims, 19 Drawing Sheets

SYSTEM FOR CONTROLLING AN AIR HANDLING SYSTEM INCLUDING A DUAL-STAGE VARIABLE GEOMETRY TURBOCHARGER

FIELD OF THE INVENTION

The present invention relates generally to air handling systems for internal combustion engines, and more specifically to systems for controlling such air handling systems including a dual-stage variable geometry turbocharger.

BACKGROUND

It is desirable to control an air handling system of an internal combustion engine, particularly during transient events, to provide for a responsive air handling system capable of responding appropriately to transient operating conditions.

SUMMARY

The present invention may comprise one or more of the features recited in the attached claims, and/or one or more of the following features and combinations thereof. In one aspect, an air handling system for an internal combustion engine may comprise a dual stage turbocharger including a high-pressure turbine having an exhaust gas inlet fluidly coupled to an exhaust manifold of the engine and an exhaust gas outlet, and a low-pressure turbine having an exhaust gas inlet fluidly coupled to the exhaust gas outlet of the high-pressure turbine and an exhaust gas outlet fluidly coupled to ambient. A turbine bypass passageway may have one end fluidly coupled to the exhaust gas inlet of the high-pressure turbine and an opposite end fluidly coupled to the exhaust gas outlet of the high-pressure turbine. A turbine bypass throttle may be disposed in-line with the turbine bypass passageway, the turbine bypass throttle controllable between fully closed and fully open positions to control a flow of exhaust gas through the turbine bypass passageway. A control circuit may include a memory having instructions stored therein that are executable by the control circuit to determine a turbine bypass control signal as a function of a target flow rate of exhaust gas through the turbine bypass throttle, a target temperature of the exhaust manifold and a target outlet temperature of the high pressure turbine, and to control a position of the turbine bypass throttle between the fully closed and fully open positions using the turbine bypass control signal to selectively divert exhaust gas flow from the exhaust manifold away from the exhaust gas inlet of the high-pressure turbine.

In another aspect, an air handling system for an internal combustion engine may comprise a dual stage turbocharger including a low-pressure compressor rotatably coupled to a low-pressure variable geometry turbine, the low-pressure compressor having an air inlet fluidly coupled to ambient and an air outlet, and a high-pressure compressor rotatably coupled to a high-pressure variable geometry turbine, the high-pressure compressor having an air inlet fluidly coupled to the air outlet of the low-pressure compressor and an air outlet fluidly coupled to an intake manifold of the engine. A low-pressure turbine actuator may be responsive to a low-pressure variable geometry turbine control signal to control a geometry of the low-pressure variable geometry turbine, and a high-pressure turbine actuator may be responsive to a high-pressure variable geometry turbine control signal to control a geometry of the high-pressure variable geometry turbine. A control circuit may include a memory having instructions stored therein that are executable by the control circuit to determine a target low-pressure compressor ratio, a target high-pressure compressor ratio, a target high-pressure compressor inlet temperature and a target high-pressure compressor inlet pressure as a function of a target outlet pressure of the high-pressure compressor and a temperature, a pressure and a target flow rate of air entering the air inlet of the low-pressure compressor, to produce the low-pressure variable geometry turbine control signal as a function of the target low-pressure compressor ratio and to produce the high-pressure variable geometry control signal as a function of the target high-pressure compressor ratio, the target high-pressure compressor inlet temperature and a target high-pressure compressor inlet pressure.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
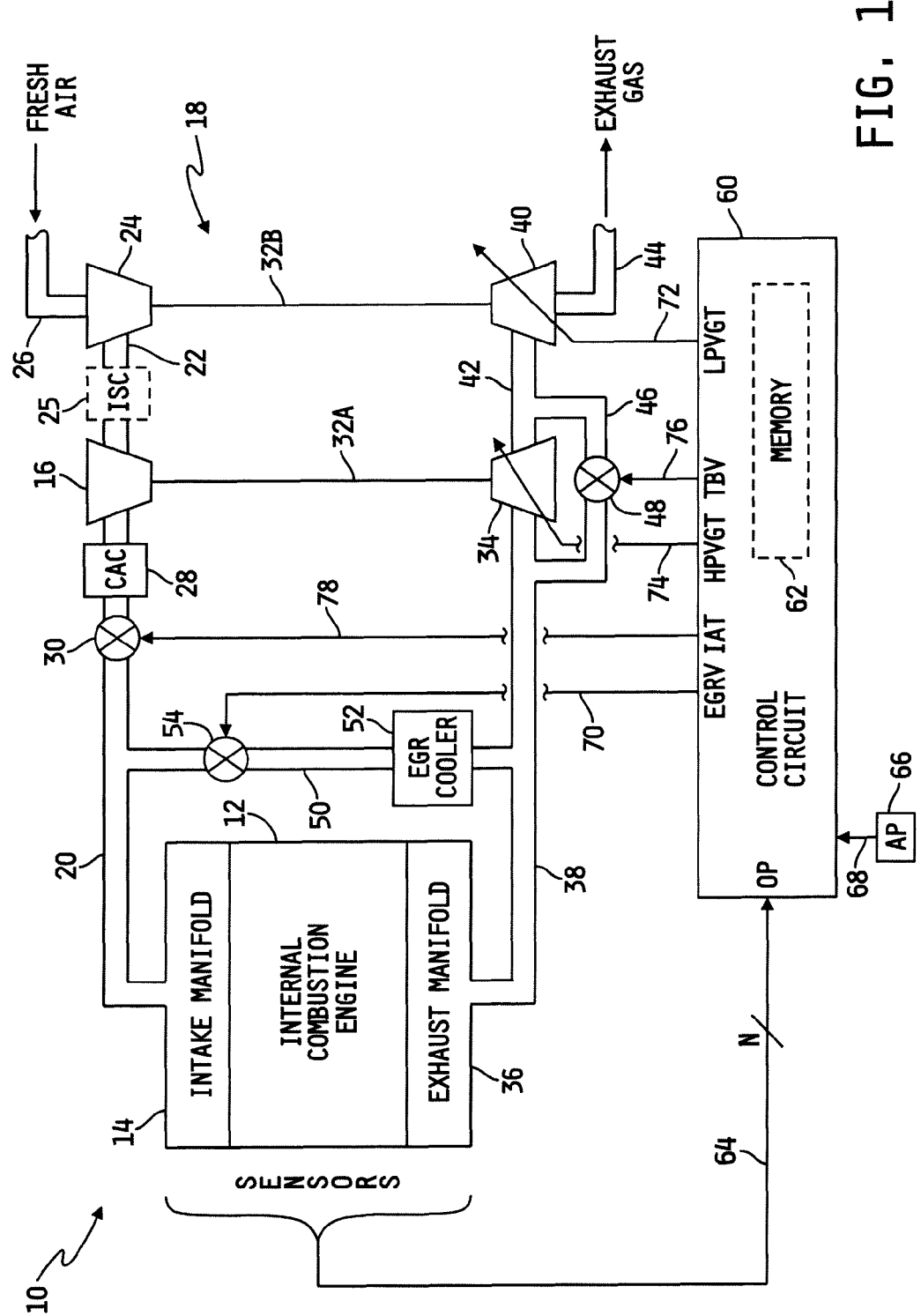
FIG. 1 is a block diagram of one illustrative embodiment of an air handling system for an internal combustion engine that includes a dual-stage turbocharger.

Referring now to FIG. 1, a block diagram is shown of one illustrative embodiment of an air handling system 10 for an internal combustion engine 12 including a dual-stage turbocharger 18. In the illustrated embodiment, the internal combustion engine 12 has an intake manifold 14 fluidly coupled to an outlet of a high-pressure compressor 16 of the dual-stage variable geometry turbocharger 18 via a fluid passageway 20. An inlet of the high pressure compressor 16 is fluidly coupled to an outlet of a low pressure compressor 24 via a fluid passageway 22, and a fresh air inlet of the low pressure compressor 24 is fluidly coupled to ambient via a fluid passageway 26 such that the low pressure compressor 16 receives fresh air at its inlet via the fluid passageway 26 and supplies the fresh air, or so-called charge air, from its outlet to the inlet of the high pressure compressor 16. In some embodiments, the system 10 may further include an inter-stage cooler 25 (ISC) disposed in-line with the fluid passageway 22, and the inter-stage cooler 25 is therefore illustrated in FIG. 1 as a dash-lined block to indicate that some embodiments of the system 10 may include the cooler and others may not. In embodiments that include the inter-stage cooler 25, the cooler 25 may be of conventional construction and operable to cool fresh air supplied at the outlet of the low pressure compressor 24 before entering the fresh air inlet of the high pressure compressor 16. In any case, the high pressure compressor 16, in turn, supplies the charge air from its outlet to the intake manifold 14 via the fluid passageway 20. The compressors 16 and 24 are illustratively of a conventional design. A high pressure compressor bypass passageway (not shown) may optionally be fluidly coupled between the inlet and the outlet of the compressor 16, and an electronically controllable bypass valve (not shown) may be disposed in-line with such a compressor bypass passageway. In this embodiment, the electronically controllable bypass valve may be controlled in a conventional manner to selectively bypass the compressor 16 when it is desirable to use only a single-stage turbocharger.

Optionally, a charge air cooler 28 may be disposed in-line with the fluid passageway 20, as is known in the art, to cool the charge air supplied by the high pressure compressor 16 to the intake manifold 14 in a conventional manner. An intake air assist throttle 30 may additionally or alternatively be optionally included, and may illustratively be disposed in-line with the fluid passageway 20 downstream of the compressor 16. In embodiments that include the charge air cooler 28 and the intake air assist throttle 30, the air assist throttle 30 is illustratively positioned downstream of the charge air cooler 30 as illustrated by example in FIG. 1.

A high pressure turbine 34 of the turbocharger 18 has a fluid inlet fluidly coupled to an exhaust manifold 36 of the engine 12 via an exhaust gas passageway 38, and a fluid outlet fluidly coupled to a fluid inlet of a low pressure turbine 40 via an exhaust gas passageway 42. A fluid outlet of the low pressure turbine 40 is fluidly coupled to ambient via an exhaust gas passageway 44. The turbine 34 is illustratively a conventional variable geometry turbocharger having a variable swallowing capacity that may be selectively controlled as indicated by the diagonal arrow passing through the turbine 34 in FIG. 1. In any case, exhaust gas produced by the engine 12 passes through the exhaust gas passageway 38 to the inlet of the turbine 34, and then passes through the outlet of the turbine 34 to the exhaust gas passageway 42 in a conventional manner. The turbine 40 is also illustratively a conventional variable geometry turbocharger having a variable swallowing capacity that may be selectively controlled as indicated by the diagonal arrow passing through the turbine 40 in FIG. 1. Exhaust gas exiting the outlet of the turbine 34 pass through the exhaust gas passageway 42 to the inlet of the turbine 40, and then passes through the outlet of the turbine 40 to ambient via the exhaust gas passageway 44 in a conventional manner. A high pressure turbine bypass passageway 46 has one end fluidly coupled to the exhaust gas passageway 38 and an opposite end fluidly coupled to the exhaust gas passageway 42. A conventional turbine bypass valve 48 is disposed in-line with the turbine bypass passageway 46, and is controllable in a conventional manner between a fully closed and a fully open position to selectively route exhaust gas around the high pressure turbine 34. The turbines 34 and 40 are illustratively of a conventional design.

The compressor 16 of the variable geometry turbocharger 18 includes a compressor wheel or disk (not shown) and the turbine 34 likewise includes a wheel or disk (not shown), and the wheel or disk of the compressor 16 is rotatably coupled to the wheel or disk of the turbine 24 via a rotatable shaft 32A. Exhaust gas flowing through the turbine 34 causes the wheel or disk of the turbine 34 to rotate, thereby causing the shaft 32A, and thus the wheel or disk of the compressor 16, to also rotate. The compressor 24 of the variable geometry turbocharger 18 likewise includes a compressor wheel or disk (not shown) and the turbine 40 includes a wheel or disk (not shown), and the wheel or disk of the compressor 24 is rotatably coupled to the wheel or disk of the turbine 40 via a rotatable shaft 32B. Exhaust gas flowing through the turbine 40 causes the wheel or disk of the turbine 40 to rotate, thereby causing the shaft 32B, and thus the wheel or disk of the compressor 24, to also rotate. Rotation of the wheel or disk of the compressors 16 and 24 draws additional air into the intake air passageway 26, thereby increasing the flow rate of air to the intake manifold 14 above what it would otherwise be without the turbocharger 18, and in this conventional manner the turbocharger 18 supplies so-called boost air to the engine 12. In the illustrated design, the high-pressure compressor 16 and turbine 34 are illustratively at least partially bypassed, via control of the valves 30 and 48, under "normal" operating conditions, wherein "normal" operating conditions for purposes of this disclosure are defined as steady state operating conditions and transient operating conditions in which engine speed and/or total fueling level and/or rate of change do not exceed a predefined engine speed and/or total fueling level and/or rate of change. Under high transient conditions, defined for purposes of this disclosure as transient operating conditions in which the engine speed and/or total fueling level and/or rate of change exceed the predefined engine speed and/or total fueling level and/or rate of change, the valves 30 and 76 are illustratively closed so that the turbine 34 receives the total exhaust gas flow from the exhaust manifold 36. The dual action of the compressors 16, 24 and turbines 34, 40 under such operating conditions allow boost pressure to build very quickly in response to the high transient operating conditions.

The air handling system 10 further includes an exhaust gas recirculation (EGR) passageway 50 fluidly coupled between the exhaust gas passageway 38 and the intake air passageway 20. An EGR cooler 52 is illustratively disposed in-line with the EGR passageway 50 for the purpose of cooling exhaust gas flowing through the EGR passageway 50, and an EGR control valve 54 is disposed in-line with the EGR passageway 50 between the EGR cooler 52 and the intake air passageway 20. The EGR control valve 54 is illustratively a conventional valve that can be electrically controlled in a conventional manner between fully closed and fully open positions to selectively control the flow rate of exhaust gas passing from the exhaust gas passageway 38 to the intake manifold 14 via the intake air passageway 20. Intake fluid supplied to the intake manifold 14 of the engine 12 by the air handling system 10 is typically referred to as a "charge" and is understood to include fresh air, or air charge, supplied through the compressors 16, 24 of the turbocharger 18 to the air intake passageway 20 and under some operating conditions of the engine 12 recirculated exhaust gas supplied through the EGR passageway 50 to the air intake passageway 20.

In the illustrated embodiment, the air handling system 10 further includes a control circuit 60 including a memory 62 having instructions stored therein that are executable by the control circuit 60 to control operation of at least the air handling system 10, and in some embodiments the control circuit 60 is operable to also control overall operation of the engine 12. The control circuit 60 illustratively includes a conventional processor, e.g., a microprocessor, which may be programmed as illustrated and described herein to control operation of the air handling system 10 as also described herein. The control circuit 60 has a number, N, of operating parameter inputs OP for receiving signals from N corresponding conventional sensors associated with the air handling system 10 and also with the engine 12 via N corresponding signal paths 64, where N may be any positive integer. The memory 62 further includes conventional instructions stored therein that are executable by the control circuit 60 to process the sensor signals produced by the N sensors to determine corresponding air handling system and/or engine operating parameters. Examples of such sensors that may be included with the air handling system 10/engine 12 and their associated operating parameters include, but are not limited to, any one or combination of a compressor inlet temperature sensor configured to produce a signal corresponding to the temperature of fresh air entering the inlet of the compressor 24, a compressor inlet pressure sensor configured to produce a signal corresponding to the pressure of air entering the inlet of the compressor 24, a compressor inlet flow rate sensor configured to produce a signal corresponding to the flow rate of fresh air entering the inlet of the compressor 24, a boost pressure sensor configured to produce a signal corresponding to charge pressure within the air intake passageway 20 and intake manifold 14, a flow rate sensor configured to produce a signal corresponding to the flow rate of fresh air supplied by the compressor 16 to the intake manifold 14 and flowing through the intake air passageway 20, an intake manifold temperature sensor configured to produce a signal corresponding to the temperature of the charge entering the engine 12 via the intake manifold 14, a speed sensor configured to produce a signal corresponding to rotational speed of the turbocharger shaft 32A and/or 32B, a speed sensor configured to produce a signal corresponding to rotational speed of the engine 12, a differential pressure sensor configured to produce a signal corresponding to the pressure differential across the EGR valve 54 or other flow restriction disposed in-line with the EGR fluid passageway 50, a temperature sensor configured to produce a temperature signal corresponding to the temperature of recirculated exhaust gas flowing through the EGR fluid passageway 50 and/or exiting the EGR cooler 52, a pressure sensor configured to produce a signal corresponding to the pressure of exhaust gas exiting the EGR cooler 52, a flow rate sensor configured to produce a signal corresponding to the flow rate of recirculated exhaust gas flowing through the EGR passageway 50, a pressure sensor configured to produce a signal corresponding to exhaust gas pressure at the outlet of the turbine 34 and/or 40, an exhaust gas temperature sensor configured to produce a signal corresponding to the temperature of exhaust gas produced by the engine 12, a temperature sensor configured to produce a signal corresponding to the operating temperature of the engine 12, e.g., the temperature of engine coolant fluid circulating through the engine 12, a conventional ambient air pressure sensor 66 electrically connected to the control circuit 60 via a signal path 68, and the like. Although such one or combination of such sensors is/are not specifically illustrated in the drawings, those skilled in the art will recognize that such one or more sensors are conventional and that various combinations of such sensors will typically be included in conventional engine and/or air handling control systems and therefore need not be specifically shown in the drawings.

In the embodiment illustrated in FIG. 1, the control circuit 60 further includes a number of outputs electrically connected to various actuators associated with the air handling system 10. For example, the control circuit 60 includes an EGR valve output, EGRV, which is electrically connected to an actuator of the EGR valve 54 via a signal path 70. The memory 52 has instructions stored therein that are executable by the control circuit 50 to selectively control the position of the EGR valve 54 relative to a reference position, e.g., relative to a fully open or fully closed position, by controlling the actuator of the EGR valve 54 via selective control of the actuator signal, i.e., EGR valve control signal, produced on the signal path 70 to thereby control the flow rate of recirculated exhaust gas through the EGR fluid passageway 54 in a conventional manner.

The control circuit 60 further includes a low-pressure variable geometry turbocharger output, LPVGT, which is electrically connected to a conventional variable geometry actuator of the low-pressure turbocharger turbine 40 via a signal path 72, and a high-pressure variable geometry turbocharger output, HPVGT, which is electrically connected to a conventional variable geometry actuator of the high-pressure turbocharger turbine 34 via a signal path 74. The memory 62 has instructions stored therein that are executable by the control circuit 60 to selectively control the geometry of the turbines 34 and 40, i.e., the exhaust gas swallowing capacity of the turbines 34 and 40 by controlling the variable geometry actuator of the turbocharger turbines 34 and 40 via selective control of an LPVGT control signal produced on the signal path 72 and selective control of an HPVGT control signal produced on the signal path 74 respectively. The control circuit 60 further includes a turbine bypass valve output, TBV, which is electrically connected to a conventional actuator of the turbine bypass valve 48 via a signal path 76. The memory 62 has instructions stored therein that are executable by the control circuit 60 to produce a turbine bypass valve control signal on the signal path 76 to selectively control the position of the turbine bypass valve 48 between fully open and fully closed positions to thereby selectively bypass, or partially bypass, the high-pressure turbine 34 by selectively diverting exhaust gas around the turbine 34. The control circuit 60 further includes an intake assist throttle output, IAT, which is electrically connected to a conventional actuator of the intake air assist throttle 30 via a signal path 78. The memory 62 has instructions stored therein that are executable by the control circuit 60 to produce an intake air throttle control signal on the signal path 78 to selectively control the position of the intake air assist throttle 30 between fully open and fully closed positions to thereby selectively restrict or increase air flow through the intake air fluid passageway 20. The instructions stored in the memory 62 for controlling operation of the variable geometry turbines 34 and 40, and operation of the intake air assist throttle 30 and the turbine bypass valve 48, will be described in greater detail hereinafter with respect to FIGS. 2-12.

Figure 2:
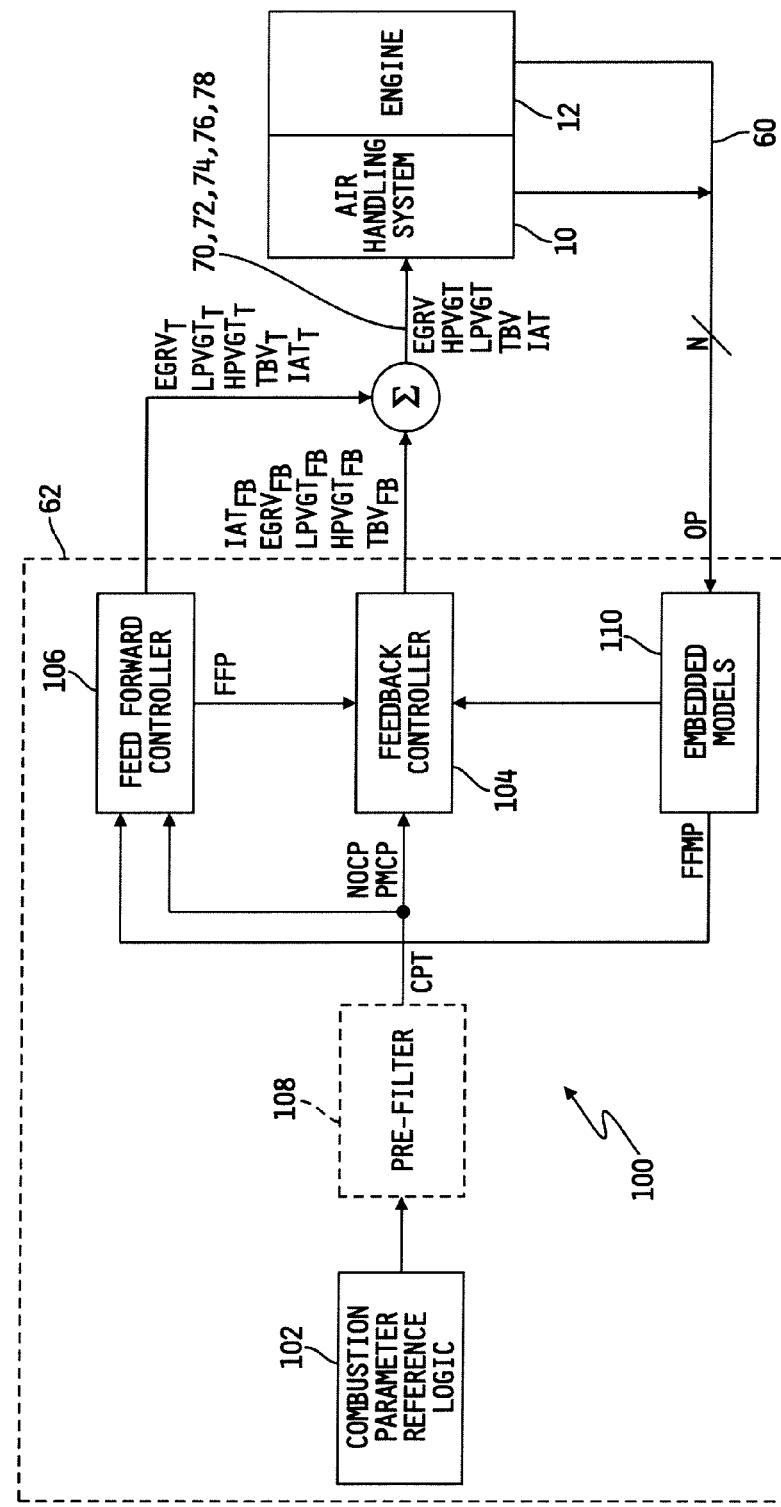
FIG. 2 is a block diagram of one illustrative embodiment of a control structure stored in the memory of the control circuit of FIG. 1 and that is executable by the control circuit to control operation of the air handling system.

Referring now to FIG. 2, one illustrative embodiment of a control structure 100 is shown for controlling the operation of the air handling system 10 illustrated in FIG. 1. The control structure 100 is illustratively stored in the memory 62 in the form of instructions that are executable by the control circuit 60 to control operation of the air handling system 10 as will be described hereinafter. In the illustrated embodiment, the control structure 100 includes a combustion parameter reference logic block 102 that produces conventional control parameter targets, CPT, in the form of, for example, at least a NOx emission control parameter, NOCP, and a particulate matter control parameter, PMCP, which are provided to a feedback controller 104 and also to a feed forward controller 106. Illustratively, NOCP and PMCP are surrogates for the NOx and particulate matter control parameters respectively, and examples of CPT generally and of NOCP and PMCP specifically, include, but are not limited to, one or any combination of recirculated exhaust gas flow rate, EGRFR, fresh air flow rate, FAF, charge flow rate, MCF, boost pressure, BOOST, oxygen content of exhaust gas ($O_2$), intake $O_2$ mole fraction and air-to-fuel ratio, AFR. Optionally, as illustrated in FIG. 2 in phantom, the control structure 100 may further include a pre-filter block 108 interposed between the combustion parameter reference logic block 102 and the feedback/feedforward controllers 104 and 106 respectively. The pre-filter block 108, if included, is illustratively used to modify the desired reference targets, i.e., the control parameter targets, CPT, based on the system response so that the system will produce the desired reference target values.

The feedback controller 104 generally receives one or more feedforward operating parameters, FFP, from the feedforward controller 106, e.g., in the form of one or more target operating parameters. The control structure 100 further includes an embedded models block 110, and operating parameters, OP, produced by the N different sensors associated with the air handling system 10 and/or engine 12 are provided to the embedded models block via the N signal paths 64. The embedded models block 110 includes a number of mathematical models that each produce a different model parameter based on one or more of the operating parameters, OP. Examples of some of the models included in the embedded models block include, but are not limited to, EGR valve position, EGRVP, low-pressure VGT rack position, LPVGTP, high-pressure VGT rack position, HPVGTP, intake air throttle position, IATP, turbine bypass valve position, TBVP, exhaust manifold pressure, EMPFB, NOx emission parameter, NOFB (modeled NOx emission value, corresponding to NOCP, which is based on one or more measured or otherwise monitored operating parameters, OP), particulate matter parameter, PMFB (modeled particulate matter value, corresponding to PMCP, which is based on one or more measured or otherwise monitored operating parameters, OP), low-pressure compressor inlet temperature, CIT, and compressor inlet pressure, CIP, of each of the compressor 24. The embedded models 110 provide one or more such model values in the form of one or more feedback model parameters, FBMP, to the feedback controller 104, and provide one more model values in the form of one or more feedforward model parameters, FFMP, to the feedforward controller 106. In any case, the feedback controller 104 produces a feedback component $IAT_{FB}$ of the intake assist throttle control signal, IAT, a feedback component $EGRV_{FB}$ of the EGR valve control signal, EGRV, a feedback component, $LPVGT_{FB}$ of the low-pressure VGT control signal, LPVGT, a feedback component, $HPVGT_{FB}$ of the high-pressure VGT control signal, HPVGT and a feedback component, $TBV_{FB}$ of the turbine bypass valve control signal, TBV, and provides these values to a summation block 112. The feedforward controller 106 produces a feedforward or target component, $EGRV_T$, of the EGR valve control signal, EGRV, a feedforward or target component, $LPVGT_T$ of the low-pressure VGT control signal, LPVGT, a feedforward or target component, $HPVGT_T$ of the high-pressure VGT control signal, HPVGT, a feedforward or target component $TBV_T$ of the turbine bypass valve control signal, TBV, and a feedforward or target component, $IAT_T$, of the intake air assist throttle control signal, IAT, and provides these values to the summation block 112. The summation block 112 combines the sum of $EGR_{FB}$ and $EGRV_T$ to produce the EGR valve control signal EGRV on the signal path 70, combines the sum of $LPVGT_{FB}$ and $LPVGT_T$ to produce the low-pressure VGT control signal LPVGT, on the signal path 72, combines the sum of $HPVGT_{FB}$ and $HPVGT_T$ to produce the high-pressure VGT control signal HPVGT, on the signal path 74, combines the sum of $TBV_{FB}$ and $TBV_T$ to produce the turbine bypass valve control signal TBV, on the signal path 76, and combines the sum of $IAT_{FB}$ and $IAT_T$ to produce the intake air assist throttle control signal IAT on the signal path 78.

Figure 3:
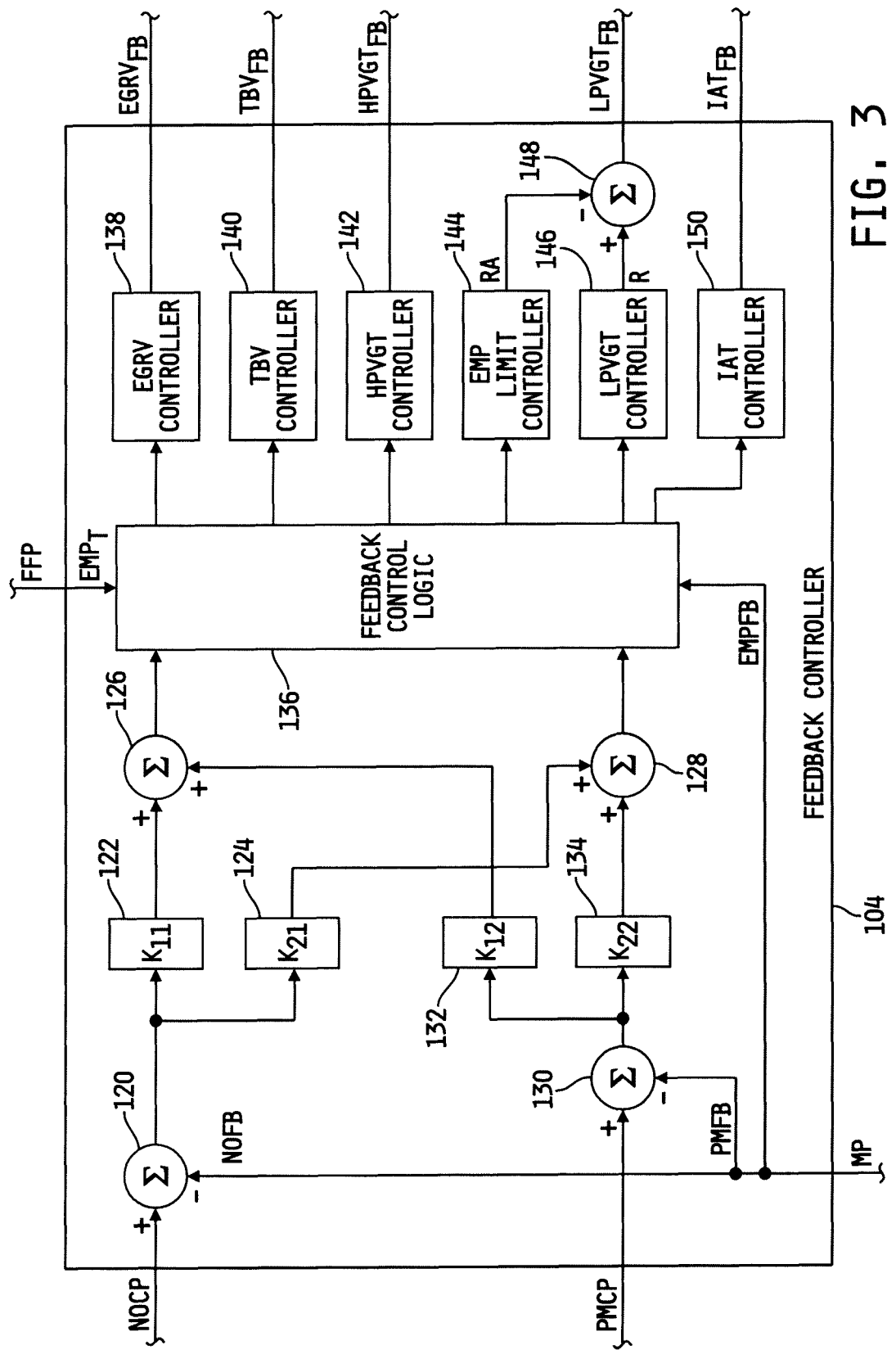
FIG. 3 is a block diagram of one illustrative embodiment of the feedback controller illustrated in FIG. 2.

Referring now to FIG. 3, one illustrative embodiment of the feedback controller 104 illustrated in FIG. 2 is shown. In the illustrated embodiment, the feedback controller 104 includes a summation node 120 having an additive input receiving the NOx emissions control parameter, NOCP, and a subtractive input receiving the measured or modeled NOx emissions parameter, NOFB, and an output producing the value NOCP−NOFB. The output of the summation node 120 is provided to first and second weighting parameter multiplication blocks 122 and 124 respectively. The multiplication block 122 multiplies the output of the summation node 120 by a weighting parameter $K_{11}$, and the resulting value, $K_{11}*(NOCP-NOFB)$ is provided to an additive input of another summation node 126. The multiplication block 124 similarly multiplies the output of the summation node 120 by a weighting parameter $K_{21}$, and the resulting value, $K_{21}*(NOCP-NOFB)$ is provided to an additive input of yet another summation node 128. The feedback controller 104 further includes another summation node 130 having an additive input receiving the particulate matter control parameter, PMCP, and a subtractive input receiving the measured or modeled particulate matter parameter, PMFB, and an output producing the value PMCP−PMFB. The output of the summation node 130 is provided to third and fourth weighting parameter multiplication blocks 132 and 134 respectively. The multiplication block 132 multiplies the output of the summation node 130 by a weighting parameter $K_{12}$, and the resulting value, $K_{12}*(PMCP-PMFB)$ is provided to another additive input of the summation node 126. The output of the summation node 126, $K_{11}*(NOCP-NOFB)+K_{12}*(PMCP-PMFB)$, is provided to one input of a feedback control logic block 136. The multiplication block 134 similarly multiplies the output of the summation node 130 by a weighting parameter $K_{22}$, and the resulting value, $K_{22}*(PMCP-PMFB)$ is provided to another additive input of the summation node 128. The output of the summation node 128, $K_{21}*(NOCP-NOFB)+K_{22}*(PMCP-PMFB)$, is provided to another input of the feedback control logic block 136.

In the illustrated embodiment, a single feedforward parameter, FFP, e.g., target exhaust manifold pressure, $EMP_T$, is also provided as an input to the feedback control logic block 136, as is the corresponding model parameter (FBMP) in the form of the measured or modeled exhaust manifold pressure value EMPFB. One output of the feedback control logic block 136 is provided as an input to an EGR valve (EGRV) controller 138, the output of which is the feedback component of EGR valve control signal, $EGRV_{FB}$. Another output of the feedback control logic block 136 is provided as an input to a turbine bypass valve (TBV) controller 140, the output of which is the feedback component of the turbine bypass valve control signal, $TBV_{FB}$. Another output of the feedback control logic block 136 is provided as an input to a high-pressure VGT (HPVGT) controller 142, the output of which is the feedback component of the high-pressure variable geometry turbine control signal, $HPVGT_{FB}$. Another output of the feedback control logic block 136 is provided as an input to an exhaust manifold pressure (EMP) limit controller 144, the output of which is a low-pressure VGT rack position adjustment value, RA, and is provided to a subtractive input of a summation node 148, and yet another output of the feedback control logic block 136 is provided as an input to a low pressure VGT (LPVGT) controller 146, the output of which is a low pressure VGT rack position value, R, and is provided to an additive input of the summation node 146. The output of the summation node 148 is the feedback component of the low-pressure variable geometry turbine control signal, $LPVGT_{FB}$, and represents the output of the LPVGT controller 146 limited by the output of the EMP limit controller 142, or $LPVGT_{FB}=R-RA$. Yet another output of the feedback control logic block 136 is provided as an input to an intake air throttle (IAT) controller 150, the output of which is the feedback component of the intake air throttle control signal, $IAT_{FB}$.

The feedback controller 104 is used in a conventional manner to reduce system performance variability by continually correcting for model errors and compensating for unknown disturbances. The feedback controller 104 illustrated in FIG. 3 is illustratively structured with generic inputs, NOCP and PMCP, and incorporates weighting compensators or parameters, $K_{11}$, $K_{12}$, $K_{21}$ and $K_{22}$ that may be calibrated such that NOCP or PMCP wins in situations where both reference targets cannot be achieved simultaneously. In the feedback controller 104 illustrated in FIG. 3, the generic air handling control spaces are represented as the NOx control parameter, NOCP and the particulate matter control parameter, PMCP. The NOx emissions control parameter, NOCP, and the measured or modeled NOx emissions parameter, NOFB, represent the control parameter that strongly correlates with NOx emissions, and the particulate matter control parameter, PMCP, and the measured or modeled particulate matter parameter, PMFB, represent the control parameter that strongly correlates with particulate emissions. The weighting parameters, $K_{11}$, $K_{12}$, $K_{21}$ and $K_{22}$ represent the sensitivity between the corresponding actuator command and the control variable. In one illustrative example, NOCP may be an EGR flow rate target, EGRFR, and NOFB may be the modeled or measured EGR flow rate, and PMCP may be a charge flow rate target and PMFB may be the modeled or measured charge flow rate. In this illustrative example, $K_{12}$ may represent the extent of closing the EGR valve 38 to increase boost by speeding up the rotational speed of the turbocharger 18, and $K_{21}$ may represent the extent of using the VGT to build back pressure for EGR flow. Similarly, $K_{12}$ may represent the position of the EGR valve 42 to achieve the charge flow target while $K_{22}$ may represent the position of the VGT actuator to achieve the same. The weighting compensators or parameters, $K_{11}$, $K_{12}$, $K_{21}$ and $K_{22}$, may be constants, linearly dynamic or non-linearly dynamic.

Illustratively, partial derivatives can be used to estimate the weighting factors at a given engine operation as follows:

$K_{11}=\partial uNOx/\partial NOCP$ $K_{12}=\partial uNOx/\partial PMCP$ $K_{21}=\partial uPM/\partial NOCP$ $K_{22}=\partial uPM/\partial PMCP,$ where, uNox is the primary NOx control actuation command, e.g., EGRV, and uPM is the primary particulate matter control actuation command, e.g., VGT.

The feedback control logic block 136 contains control logic for selecting the error signals to be fed to the various controllers 138, 140, 142, 144, 146 and 150. In the illustrated embodiment, for example, the EGR valve control error, $E_{EGRVC}$, provided as the input to the EGRV controller 138 is set by the logic block 136 to the value of the output of the summation block 126, i.e., $E_{EGRVC}=K_{11}*(NOCP-NOFB)+K_{12}*(PMCP-PMFB)$. The EGRV controller 138 is illustratively a PID controller producing the feedback component of the EGRV control signal, $EGRV_{FB}$, according to the equation $EGRV_{FB}=K_{EGRp}*E_{EGRVC}+K_{EGRi}*\int E_{EGRVC}dt+K_{EGRd}*dE_{EGRVC}/dt$, where $K_{EGRp}$ is the proportional gain, $K_{EGRi}$ is the integral gain and $K_{EGRd}$ is the derivative gain. It will be understood that the EGRV controller 138 may alternatively be provided in the form of another conventional controller such as a PI controller or other known controller.

In the illustrated embodiment, the turbine bypass valve control error, $E_{TBVC}$, provided as the input to the TBV controller 140 is set by the logic block 136 to the value of the output of the summation block 126, i.e., $E_{TBVC}=K_{11}*(NOCP-NOFB)+K_{12}*(PMCP-PMFB)$. The TBV controller 140 is illustratively a PID controller producing the feedback component of the TBV control signal, $TBV_{FB}$, according to the equation $TBV_{FB}=K_{TBVp}*E_{TBVC}+K_{TBVi}*\int E_{TBVC}dt+K_{TBVd}*dE_{TBVC}/dt$, where $K_{TBVp}$ is the proportional gain, $K_{TBVi}$ is the integral gain and $K_{TBVd}$ is the derivative gain. It will be understood that the TBV controller 140 may alternatively be provided in the form of another conventional controller such as a PI controller or other known controller.

In the illustrated embodiment, the HPVGT control error, $E_{HPVGTC}$, provided as the input to the HPVGT controller 142 is set by the logic block 136 to the value of the output of the summation block 128, i.e., $E_{HPVGTC}=K_{21}*(NOCP-NOFB)+K_{22}*(PMCP-PMFB)$. The HPVGT controller 142 is illustratively a PID controller producing a feedback component of the HPVGT rack position control signal, $HPVGT_{FB}$, according to the equation $HPVGT_{FB}=K_{HPVGTp}*E_{HPVGTC}+K_{HPVGTi}*\int E_{HPVGTC}dt+K_{HPVGTd}*dE_{HPVGTC}/dt$, where $K_{HPVGTp}$ is the proportional gain, $K_{HPVGTi}$ is the integral gain and $K_{HPVGTd}$ is the derivative gain. It will be understood that the HPVGT controller 142 may alternatively be provided in the form of another conventional controller such as a PI controller or other known controller.

In the illustrated embodiment, the LPVGT control error, $E_{LPVGTC}$, provided as the input to the LPVGT controller 146 is set by the logic block 136 to the value of the output of the summation block 128, i.e., $E_{LPVGTC} = K_{21}*(NOCP-NOFB) + K_{22}*(PMCP-PMFB)$. The LPVGT controller 146 is illustratively a PID controller producing a feedback component of the LPVGT rack position control signal, R, according to the equation $R = K_{LPVGTp}*E_{LPVGTC} + K_{LPVGTi}*\int E_{LPVGTC}dt + K_{LPVGTd}*dE_{LPVGTC}/dt$, where $K_{LPVGTp}$ is the proportional gain, $K_{LPVGTi}$ is the integral gain and $K_{LPVGTd}$ is the derivative gain. It will be understood that the LPVGT controller 146 may alternatively be provided in the form of another conventional controller such as a PI controller or other known controller.

In the illustrated embodiment, the exhaust manifold pressure control error, $E_{EMPC}$, provided as the input to the EMP limit controller 144 is set by the logic block 136 to the value of the difference between the exhaust manifold pressure target, $EMP_T$, and the measured or modeled value of the exhaust manifold pressure, EMPFB, or $E_{EMPC} = EMP_T - EMPFB$. The EMP limit controller 144 is illustratively a PID controller producing an LPVGT rack position adjustment signal, RA, according to the equation $RA = K_{EMPp}*E_{EMPC} + K_{EMPi}*\int E_{EMPC}dt + K_{EMPd}*dE_{EMPC}/dt$, where $K_{EMPp}$ is the proportional gain, $K_{EMPi}$ is the integral gain and $K_{EMPd}$ is the derivative gain. It will be understood that the EMP limit controller 144 may alternatively be provided in the form of another conventional controller such as a PI controller or other known controller. In any case, the feedback component of the LPVGT control signal, $LPVGT_{FB}$, is the difference between R and RA, or $LPVGT_{FB} = R - RA$.

In the illustrated embodiment, the intake air throttle control error, $E_{IATC}$, provided as the input to the IAT controller 150 is set by the logic block 136 to the value of the output of the summation block 126, i.e., $E_{IATC} = K_{11}*(NOCP-NOFB) + K_{12}*(PMCP-PMFB)$. The IAT controller 150 is illustratively a PID controller producing the feedback component of the IAT control signal, $IAT_{FB}$, according to the equation $IAT_{FB} = K_{IATp}*E_{IATC} + K_{IATi}*\int E_{IATC}dt + K_{IATd}*dE_{IATC}/dt$, where $K_{IATp}$ is the proportional gain, $K_{IATi}$ is the integral gain and $K_{IATd}$ is the derivative gain. It will be understood that the IAT controller 150 may alternatively be provided in the form of another conventional controller such as a PI controller or other known controller.

It will be understood that in embodiments of the air handling system 10 that include one or more additional actuators as described hereinabove, the feedback controller 104 may likewise include one or more additional controllers that receive error inputs from the feedback control logic block 136 and produce one or more corresponding actuator feedback signals.

Figure 4:
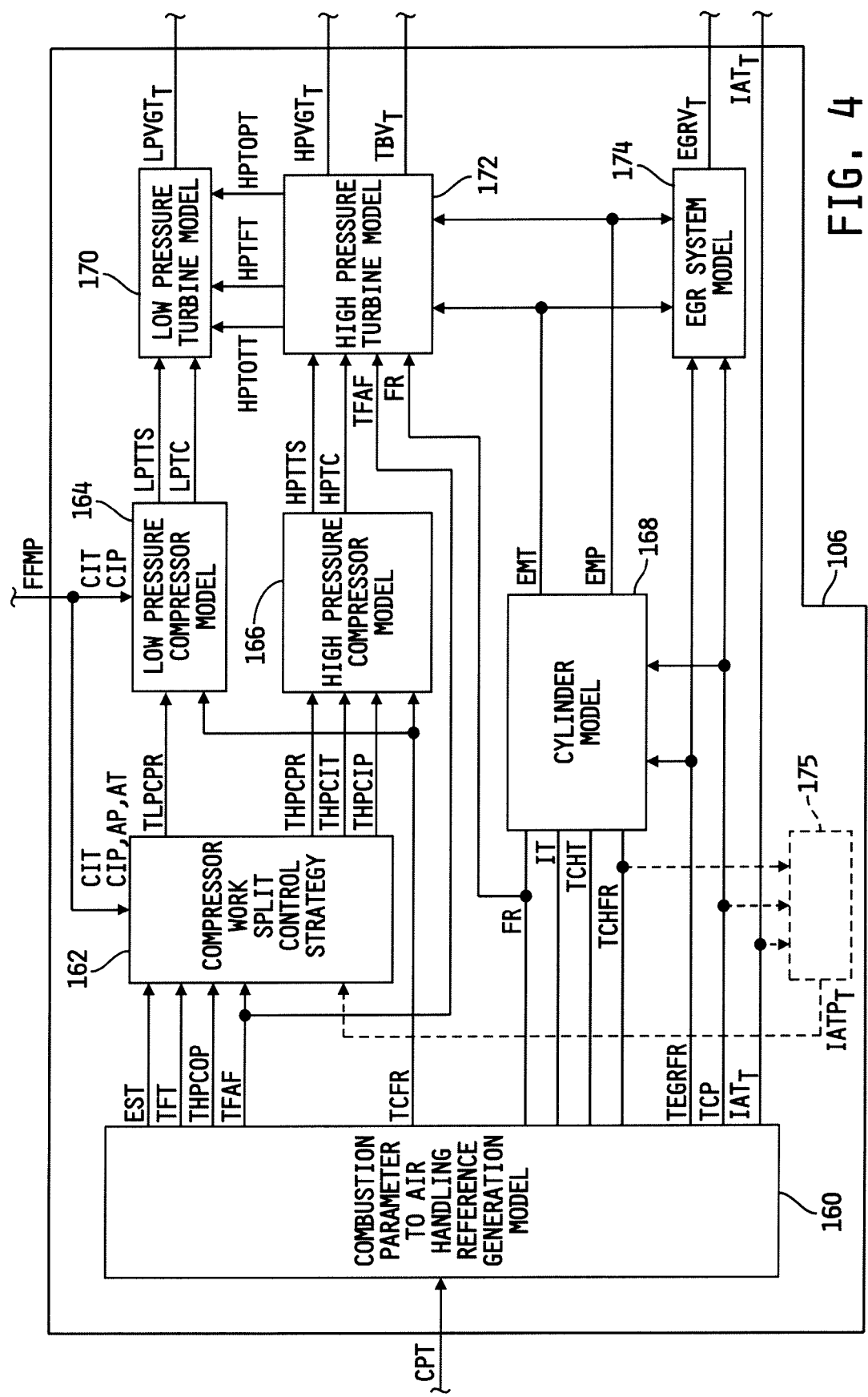
FIG. 4 is a block diagram of one illustrative embodiment of the feedforward controller illustrated in FIG. 2.

Referring now to FIG. 4, one illustrative embodiment of the feedforward controller 106 illustrated in FIG. 2 is shown. In the illustrated embodiment, the feedforward controller 106 includes a combustion parameter to air handling reference generation model 160 that receives as inputs the various control parameter targets, CPT, produced by the combustion parameter reference logic block 102 of FIG. 2. The combustion parameter to air handling reference generation model 160 includes a number of conventional equations, maps, lookup tables or the like that translate or otherwise convert combustion references included in the CPT, e.g., fresh air flow rate, charge flow rate, EGR flow rate and intake $O_2$ mole fraction, to turbocharger-machinery references or targets such as an engine speed target, EST, a total fueling target, TFT, a target fresh air flow rate, TFAF, a target high-pressure compressor outlet pressure, THPCOP, and a target compressor flow rate, TCFR, cylinder and manifold references or targets such as a target fueling rate, FR, a target injection timing, IT, a target charge temperature, TCHT, a target charge flow rate, TCHFR, a target charge pressure, TCP, and a target EGR flow rate, TEGRFR, and an the feedforward or target component, $IAT_T$, of the intake air assist throttle control signal, IAT.

The feedforward controller 106 further includes a compressor work split control strategy 162 that receives as inputs the engine speed target, EST, the total fueling target, TFT, the target high-pressure compressor outlet pressure, THPCOP and the target fresh air flow rate, TFAF, and in the illustrated embodiment further receives as inputs from the embedded models 110 feedforward model parameters, FFMP, in the form of measured or modeled values of a low-pressure compressor inlet temperature, CIT, a low-pressure compressor inlet pressure, CIP, ambient air pressure, AP, and ambient temperature, AT. The compressor work split control strategy 162 includes logic which balances the work split between the low-pressure variable geometry turbocharger and the high-pressure variable geometry turbocharger to optimize performance of each such turbocharger stage during various operating conditions of the engine 12. The compressor work split control strategy 162 processes the various inputs and produces as outputs a target low-pressure compressor pressure ratio, TLPCPR, a target high-pressure compressor pressure ratio, THPCR, a target high pressure compressor inlet temperature, THPCIT, and a target high pressure compressor inlet pressure, THPCIP. Further details relating to one illustrative embodiment of the compressor work split control strategy 162 will be described hereinafter with respect to FIGS. 5-13.

The feedforward controller 106 further includes a low-pressure compressor model 164 that receives as inputs the target low-pressure compressor pressure ratio, TLPCPR, produced by the compressor work split control strategy 162 and the target compressor flow rate, TCFR, and in the illustrated embodiment further receives as inputs from the embedded models 110 feedforward model parameters, FFMP, in the form of measured or modeled values of the low-pressure compressor inlet temperature, CIT, and the low-pressure compressor inlet pressure, CIP. The low-pressure compressor model 162 includes an embedded model of the low-pressure compressor 24 which determines a target low-pressure compressor rotational speed, which is the same as the low-pressure turbine rotational speed and is therefore labeled in FIG. 4 as a low-pressure target turbocharger speed, LPTTS, and a low-pressure target compressor torque, LPCT.

The feedforward controller 106 further includes a high-pressure compressor model 166 that receives as inputs the target high-pressure compressor pressure ratio, THPCPR, the target high-pressure compressor inlet temperature, THPCIT, and the target high-pressure compressor inlet pressure, THPCIP, produced by the compressor work split control strategy 162, and the target compressor flow rate, TCFR, produced by the combustion parameter to air handling reference generation model 160. The high-pressure compressor model 166 includes an embedded model of the high-pressure compressor 16 which determines a target high-pressure compressor rotational speed, which is the same as the high-pressure turbine rotational speed and is therefore labeled in FIG. 4 as a high-pressure target turbocharger speed, HPTTS, and a high-pressure target compressor torque, HPCT. Further details relating to one illustrative embodiment of the compressor models 164 and 166 will be described hereinafter with respect to FIGS. 14-17.

The feedforward controller 106 further includes a cylinder model 168 that receives as inputs the target fueling rate, FR, the target injection timing, IT, the target charge temperature, TCHT, the target charge flow rate, TCHFR, the target charge pressure, TCP, and the target EGR flow rate, TEGRFR produced by the combustion parameter to air handling reference generation model 160. The cylinder model 168 includes a model that estimates desired (target) exhaust manifold temperature, EMT, (i.e., high-pressure turbine inlet temperature) and desired (target) exhaust manifold pressure, EMP, (i.e., high-pressure turbine inlet pressure) from the foregoing air handling and fuel injection references. Further details relating to one illustrative embodiment of the cylinder model 168 is described in co-pending U.S. patent application Ser. No. 13/244,550, the disclosure of which is incorporated herein by reference in its entirety.

The feedforward controller 106 further includes a high-pressure turbine model 172 that receives as inputs the high-pressure target turbocharger speed, HPTTS, and the high-pressure target compressor torque, HPTCT, produced by the high-pressure compressor model 166, the target fresh air flow rate, TFAF, and the target fueling rate, FR, produced by the combustion parameter to air handling reference generation model 160, and the target exhaust manifold temperature and pressure values, EMT, and EMP, produced by the cylinder model 168. The high-pressure turbine model 172 includes an embedded model of the high-pressure turbine 34 which estimates the feedforward or target component, $HPVGT_T$, of the high-pressure VGT control signal, HPVGT, and the feedforward or target component, $TBV_T$, of the turbine bypass valve control signal, TBV. The high-pressure turbine model 172 further produces as outputs a high-pressure turbine outlet temperature target, HPTOTT, a high-pressure turbine outlet pressure target, HPTOPT, and a high-pressure turbine flow target, HPTFT. Further details relating to one illustrative embodiment of the high-pressure turbine model 172 will be described in detail hereinafter with respect to FIGS. 18-23.

The feedforward controller 106 further includes a low-pressure turbine model 170 that receives as inputs the low-pressure target turbocharger speed, LPTTS, and the low-pressure target compressor torque, LPTCT, produced by the low-pressure compressor model 164, and the high-pressure turbine outlet temperature target, HPTOTT (corresponding to a low-pressure turbine inlet temperature target), the high-pressure turbine outlet pressure target, HPTOPT (corresponding to a low-pressure turbine inlet temperature target), and the high-pressure turbine flow target, HPTFT, produced by the high-pressure turbine model 172. The low-pressure turbine model 170 includes an embedded model of the low-pressure turbine 40 which estimates the feedforward or target component, $LPVGT_T$ of the low-pressure VGT control signal, LPVGT. Further details relating to one illustrative embodiment of the low-pressure turbine model 170 will be described in detail hereinafter with respect to FIGS. 24-25.

The feedforward controller 106 further includes an EGR system model 174 that receives as inputs the target charge pressure, TCP, and the target EGR flow rate, TEGRFR, produced by the combustion parameter to air handling reference generation model 160, as well as the target exhaust manifold temperature, EMT, and the target exhaust manifold pressure target, EMP, produced by the cylinder model 168. The EGR system model 174 includes an embedded model that illustratively uses conventional momentum and Bernoulli equations to determine a position of the EGR valve 54 relative to a reference position that will meet the EGR flow reference targets, and to produce a corresponding EGR valve target signal, $EGR_T$.

As illustrated by dashed-line representation in FIG. 4, the feedforward controller 106 may optionally further include an intake air assist throttle model 175 that receives as inputs the target charge flow rate, TCHFR, the target charge pressure, TCP, and the intake air throttle target, $IAT_T$, all produced by the combustion parameter to air handling reference generation model 160. The intake air assist throttle model 175 includes an embedded model that illustratively computes a target intake air assist throttle inlet pressure, $IATP_T$ as a function of TCHFR, TCP and $IAT_T$. In embodiments that include the intake air assist throttle 30, it will introduce a pressure drop in the fluid passageway 20. Such a pressure drop across the intake air assist throttle 30 will be compensated by the turbocharger 18, which means that the compressors 16 and 24 will have to do more work. In embodiments that include the intake air assist throttle model 175, the target intake air assist throttle inlet pressure, $IATP_T$, will illustratively be used by the compressor work split control strategy 162 to account for such extra work required of the compressors(s) 16 and/or 24 as a result of inclusion in the system 10 of the intake air assist throttle 30.

Figure 5:
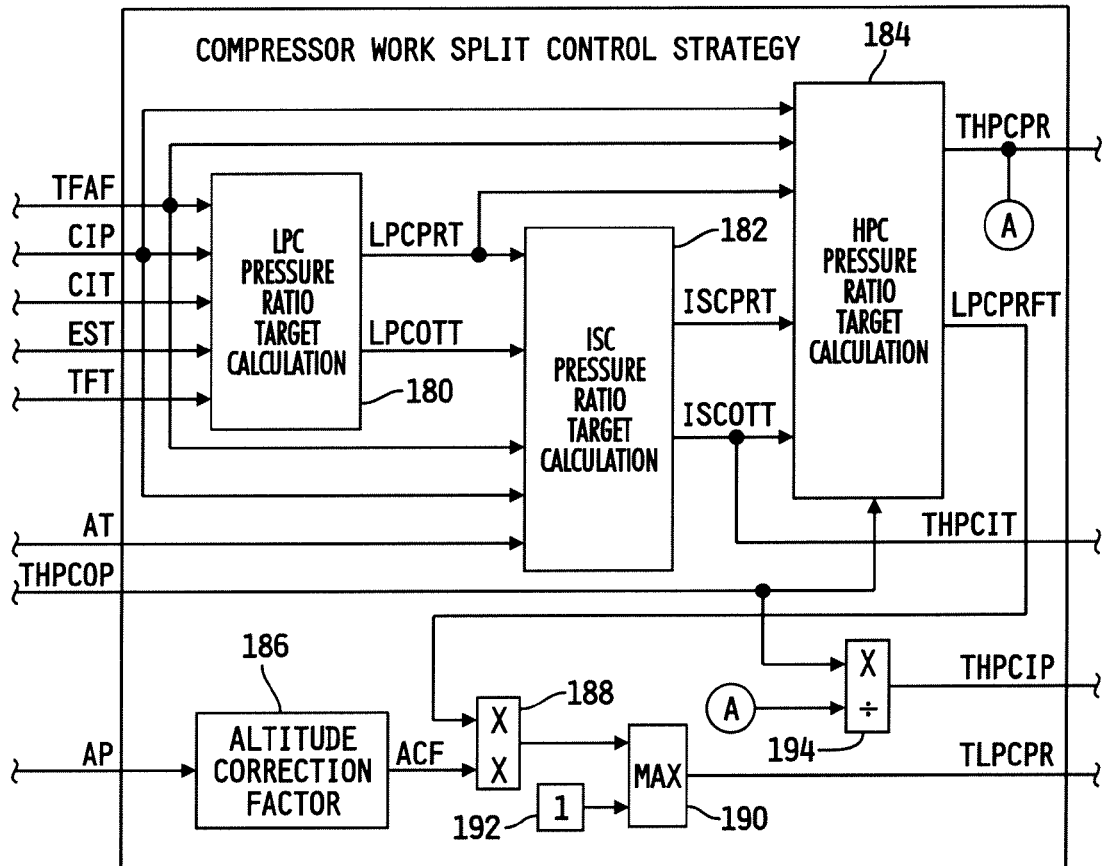
FIG. 5 is a block diagram of one illustrative embodiment of the compressor work-split control strategy illustrated in FIG. 4.

Referring now to FIG. 5, one illustrative embodiment of the compressor work split control strategy 162 illustrated in FIG. 4 is shown. In the illustrated embodiment, the compressor work split control strategy 162 includes a low-pressure compressor (LPC) pressure ratio target calculation block 180 which receives as inputs the target fresh air flow rate, TFAF, the engine speed target, EST, and the total fuel target, TFT, produced by the combustion parameter to air handling reference generation model 160, as well as the low-pressure compressor inlet temperature and pressure values, CIT and CIP respectively. The LPC pressure ratio target calculation block 180 includes logic which processes the various inputs and produces as outputs a low-pressure compressor pressure ratio target, LPCPRT, and a low-pressure compressor outlet temperature target, LPCOTT. Further details relating to one illustrative embodiment of the low-pressure pressure ratio target calculation block 180 will be described in detail hereinafter with respect to FIGS. 7-10.

In embodiments in which the system 10 includes an inter-stage cooler 25 as illustrated in FIG. 1, the compressor work split control strategy 162 further includes an inter-stage cooler (ISC) pressure ratio target calculation block 182 which receives as inputs the low-pressure compressor pressure ratio target, LPCPRT, and the low-pressure compressor outlet temperature target, LPCOTT produced by LPC pressure ratio calculation block 180, the low-pressure compressor inlet temperature and pressure values, CIT and CIP respectively, and the ambient air temperature, AT. The ISC pressure ratio target calculation block 182 includes logic which processes the various inputs and produces as outputs an inter-stage cooler pressure ratio target, ISCPRT, and an inter-stage cooler outlet temperature target, ISCOTT. The inter-stage cooler outlet temperature, ISCOTT, is the target high-pressure compressor inlet temperature, THPCIT, produced by the compressor work split control strategy block 162. Further details relating to one illustrative embodiment of the ISC pressure ratio target calculation block 182 will be described in detail hereinafter with respect to FIG. 11.

The compressor work split control strategy 162 further includes a high-pressure compressor (HPC) pressure ratio target calculation block 184 which receives as inputs the inter-stage cooler pressure ratio target, ISCPRT, and the inter-stage cooler outlet temperature target, ISCOTT, produced by the ISC pressure ratio target calculation block 182, the low-pressure compressor inlet temperature and pressure values, CIT and CIP respectively, the low-pressure compressor pressure ratio target, LPCPRT, produced by the LPC pressure ratio target calculation block 180, as well as the target fresh air flow rate, TFAF, and the target high pressure compressor outlet pressure, THPCOP. The HPC pressure ratio target calculation block 184 includes logic which processes the various inputs and produces as outputs the target high-pressure compressor pressure ratio target, HPCPRT, and a low-pressure compressor pressure ratio final target, LPCPRFT. Further details relating to one illustrative embodiment of the low-pressure compressor pressure ratio target calculation block 180 will be described in detail hereinafter with respect to FIGS. 12-13. In embodiments of the system 10 that do not include the inter-stage cooler 25, the ISC Pressure Ratio Target Calculation block 182 may be omitted, in which case the low pressure compressor ratio target value, LPCPRT, is provided as an input to the HPC Pressure Ratio Target Calculation block 184 in place of the inter-stage cooler pressure ratio target, ISCPPRT, and the low pressure compressor outlet temperature target, LPCOTT, is provided as an input to the HPC Pressure Ratio Target Calculation block 184 in place of the inter-stage cooler outlet temperature target, ISCOTT (in which case LPCPRT=THPCIT). Alternatively, the ISC Pressure Ratio Target Calculation block 182 may be included, but may be disabled or bypassed in embodiments of the system 10 that do not include an inter-stage cooler 25 such that ISCPRT=LPCPRT and ISCOTT=LPCOTT=THPCIT.

Figure 6:
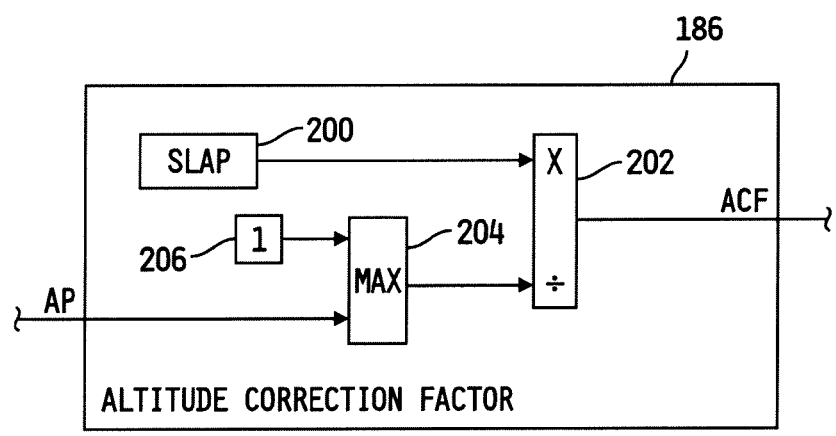
FIG. 6 is a block diagram of one illustrative embodiment of the altitude correction factor block illustrated in FIG. 5.

The final low-pressure compressor pressure ratio final target, LPCPRFT, is provided as one input of a multiplication block 188 having another input receiving the output of an altitude correction factor block 186. The altitude correction factor block 186 receives as an input the ambient air pressure, AP, and produces as an output an altitude compensation factor as a function thereof. Referring now to FIG. 6, one illustrative embodiment of the altitude correction factor block 186 is shown. The altitude correction factor block 186 includes a memory location 200 have stored therein a sea level ambient pressure value, SLAP, which is illustratively a constant indicative of ambient air pressure at sea level. The SLAP value is provided as a multiplication input of an arithmetic block 202 having a division input receiving the output of a MAX block 204. One input of the MAX block receives the ambient pressure value, AP, and another input receives the value 1 stored in a memory location 206. The output of the arithmetic block 202 is the altitude correction factor, ACF, and in the embodiment illustrated in FIG. 6 is defined as ACF=SLAP/[MAX(1, AP)].

Referring again to FIG. 5, the output of the multiplication block 188 is provided as one input of a MAX block 190 having another input receiving the value 1 stored in a memory location 192. The output of the MAX block 190 is the target low-pressure compressor pressure ratio, TLPCPR, produced by the compressor work split control strategy block 162, and in the embodiment illustrated in FIG. 5 is defined as TLPCPR=MAX[1, (LPCPRFT*ACF)]. The target high-pressure compressor outlet pressure, THPOP, is also provided as a multiplication input of an arithmetic block 194 having a division input receiving the target high-pressure compressor pressure ratio, THPCPR, produced by the HPD pressure ratio target calculation block 184. The output of the arithmetic block 194 is the target high-pressure compressor inlet pressure, TLPCIP, produced by the compressor work split control strategy block 162, and in the embodiment illustrated in FIG. 5 is defined as THPCIP=THPCOP/THPCPR.

Figure 7:
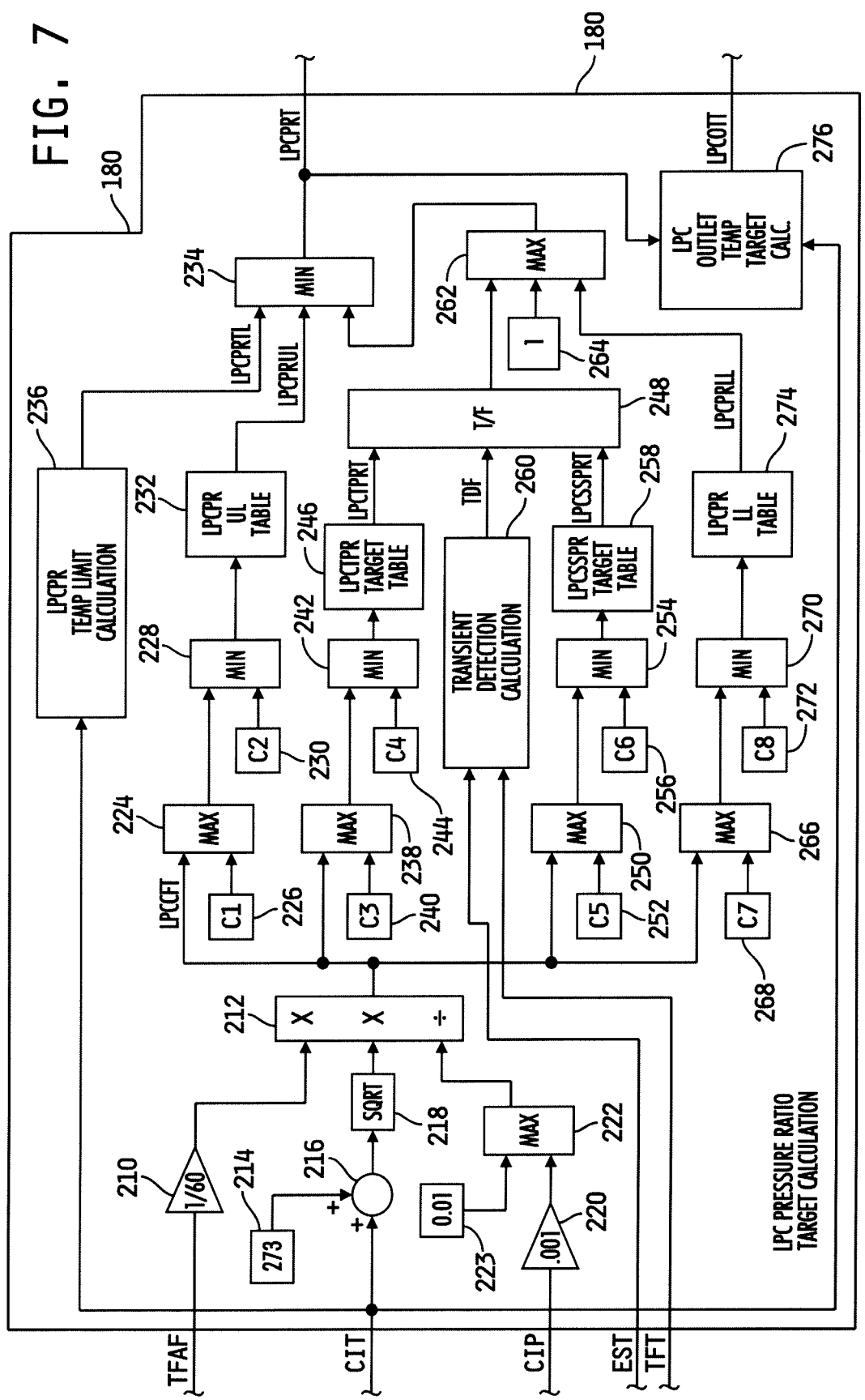
FIG. 7 is a block diagram of one illustrative embodiment of the LPC pressure ratio target calculation block illustrated in FIG. 5.

Referring now to FIG. 7, one illustrative embodiment of the LCP pressure ratio target calculation block 180 illustrated in FIG. 5 is shown. In the illustrated embodiment, the LPC pressure ratio target calculation block 180 includes a multiplication block 210 which receives as an input the target fresh air flow rate, TFAF, and produces as an output the value TFAF/60 which is provided to a multiplication input of an arithmetic block 212. The low-pressure compressor inlet temperature, CIT, is provided to one input of a summation node 216 having another input receiving the value 273 stored in a memory location 214. The sum of CIT and 273 is passed through a square-root block 218, and the quantity SQRT (CIT+273) is provided to another multiplication input of the arithmetic block 212. The low-pressure compressor inlet pressure, CIP, is provided as an input to another multiplication block 220 which produces as an output the value CIP*0.001. The output of the multiplication block 220 is provided to one input of a MAX block 222 which has another input receiving the value 0.01 stored in a memory location 223. The output of the MAX block, MAX[0.01, (0.001*CIP)] is provided to a division input of the arithmetic block 212. The output of the arithmetic block 212 is thus the quantity [TFAF/60* SQRT(CIT+273)]/ MAX[0.01, (0.001*CIP)] which represents a low-pressure compressor corrected flow target, LPCCFT, wherein the low-pressure compressor corrected air flow target, LPCCFT, is the target fresh air flow corrected by the current inlet temperature and pressure conditions, CIT and CIP, of the low-pressure compressor 24.

The low-pressure compressor corrected flow target, LPCCFT, produced at the output of the arithmetic block 212 is provided to one input of a MAX block 224 having another input receiving a constant, C1, stored in a memory location 226. The output of the MAX block 224 is provided to one input of a MIN block 228 having another input receiving a constant C2 stored in a memory location 230. The output of the MIN block 228 is provided as an input to a low-pressure compressor pressure ratio (LPCPR) upper limit table 232. In the embodiment illustrated in FIG. 7, the constant C1 illustratively represents a minimum value of LPCCFT and the constant C2 illustratively represents a maximum value of LPCCFT, and the quantity MIN{C2, [MAX(C1, LPCCFT)]} produced at the output of the MIN block 228 represents LCPCFT bounded by upper and lower pressure ratio values C2 and C1 respectively. This quantity is provided as the input of the LPCPR upper limit table 232 which is illustratively a two-dimensional table populated with values that produces an upper low-pressure compressor pressure ratio limit, LPCPRUL, based on the bounded LPCFT value produced by the MIN block 228. The output, LPCPRUL, produced by the table 232 is provided as one input of a MIN block 234. Another input of the MIN block 234 receives a low-pressure compressor pressure ratio temperature limit value, LPCPRTL, produced by a low-pressure compressor pressure ratio (LPCPR) temperature limit calculation block 236 which receives as an input the low-pressure compressor inlet temperature value, CIT.

Figure 8:
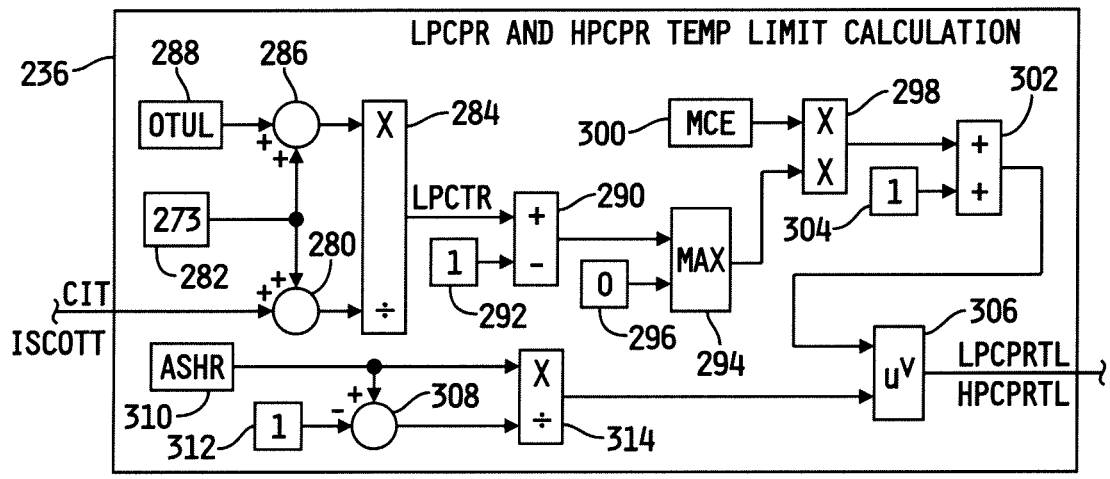
FIG. 8 is a block diagram of one illustrative embodiment of the LPCPR and temperature limit calculation block illustrated in FIG. 7.

Referring now to FIG. 8, one illustrative embodiment of the LPCPR temperature limit calculation block 236 is shown. In the illustrated embodiment, the logic of the pressure ratio temperature limit calculation block 236 is identical to that used to compute a high-pressure compressor pressure ratio temperature limit, HPCPRTL, the purpose of which will be described in hereinafter. For this reason, the pressure ratio temperature limit calculation block 235 illustrated in FIG. 8 is labeled LPCPR AND HPCPR TEMP LIMIT CALC., although it will be understood that in other embodiments the low-pressure compressor pressure ratio temperature limit calculation logic may be different than the high-pressure compressor pressure ratio temperature limit calculation block. In any case, the low-pressure compressor inlet temperature, CIT, is illustrated in FIG. 8 as being provided to one input of a summation node 280 having another input receiving the value 273 stored in a memory location 282. The output of the summation node 280 is provided to a division input of an arithmetic block 284. A low-pressure compressor outlet temperature upper limit constant, OTUL, stored in a memory location 288 is provided to one input of another summation node 286 having another input receiving the value 273 stored in the memory location 282. The output of the summation node 286 is provided to a multiplication input of the arithmetic block 284, and the output of the arithmetic block 284 is thus the quantity [(OTUL+273)/(CIT+273)] which represents a ratio of a temperature-corrected value of the upper outlet temperature limit of the low-pressure compressor and a temperature-corrected value of the low-pressure compressor inlet temperature value, or a low-pressure compressor temperature ratio, LPCTR. This output of the arithmetic block 284 is provided as an addition input of another arithmetic block 290 having a subtraction input receiving the value 1 stored in a memory location 292. The output of the arithmetic block 290 is provided to one input of a MAX block 294 having another input receiving the value 0 stored in a memory location 296. The output of the MAX block 294 is provided to one input of a multiplication block 298 having another input receiving a constant, MCE, stored in a memory location 300, where MCE represents a mean compressor efficiency value for the low-pressure compressor 24. The output of the multiplication block 298 is provided to one input of a summation block 302 having another input receiving the value 1 stored in a memory location 304. The output of the summation block 302 is provided to one input of another arithmetic block 306. If the quantity (LPCTR−1) is greater than zero, the output of the summation block 302 is $\{[MCE*(LPCTR-1)]+1\}$, and if the quantity (LPCTR−1) is less than or equal to zero, the output of the summation block 302 is 1.

The LPCPR temperature limit calculation block 236 illustrated in FIG. 8 further includes a summation node 308 having an addition input receiving a constant, ASHR, stored in a memory location 310 and a subtraction input receiving the value 1 stored in a memory location 312. The constant ASHR represents an air specific heat ratio value, and the output of the summation node 308 is provided to a division input of an arithmetic block 314 and ASHR is provided to a multiplication input of the arithmetic block 314. The output of the arithmetic block, ASHR/(ASHR−1), is provided to another input of the arithmetic block 306. The output of the arithmetic block 306 is the low-pressure compressor pressure ratio temperature limit, LPCPRTL, produced by the LPCPR temperature limit calculation block 236. If the quantity (LPCTR−1) is greater than zero, LPCPRTL=$[\{MCE*(LPCTR-1)\}+1]^{\{ASHR/(ASHR-1)\}}$ and if the quantity (LPCTR−1) is less than or equal to zero, LPCPRTL=1.

Referring again to FIG. 7, the low-pressure compressor corrected flow target, LPCCFT, produced at the output of the arithmetic block 212 is also provided to one input of a MAX block 238 having another input receiving a constant, C3, stored in a memory location 240. The output of the MAX block 238 is provided to one input of a MIN block 242 having another input receiving a constant C4 stored in a memory location 244. The output of the MIN block 242 is provided as an input to a low-pressure compressor transient pressure ratio (LPCTPR) target table 246. In the embodiment illustrated in FIG. 7, the constant C3 illustratively represents a minimum transient pressure ratio value of LPCCFT and the constant C4 illustratively represents a maximum transient pressure ratio value of LPCCFT, and the quantity MIN{C4, [MAX(C3, LPCCFT)]} produced at the output of the MIN block 242 thus represents LPCCFT bounded by upper and lower transient pressure ratio values C4 and C3 respectively. This quantity is provided as the input of the (LPCTPR) target table 246 which is illustratively a two-dimensional table populated with values that produces a low-pressure compressor transient pressure ratio target, LPCTPRT, based on the bounded LPCFT value produced by the MIN block 242. The output, LPCTPRT, produced by the table 246 is provided as a "true" input of a true/false block 248.

The low-pressure compressor corrected flow target, LPCCFT, produced at the output of the arithmetic block 212 is also provided to one input of a MAX block 250 having another input receiving a constant, C5, stored in a memory location 252. The output of the MAX block 250 is provided to one input of a MIN block 254 having another input receiving a constant C6 stored in a memory location 256. The output of the MIN block 254 is provided as an input to a low-pressure compressor steady-state pressure ratio (LPCSSPR) target table 258. In the embodiment illustrated in FIG. 7, the constant C5 illustratively represents a minimum steady-state pressure ratio value of LPCCFT and the constant C6 illustratively represents a maximum steady-state pressure ratio value of LPCCFT, and the quantity MIN{C6, [MAX(C5, LPCCFT)]} produced at the output of the MIN block 254 thus represents LPCPCFT bounded by upper and lower steady-state pressure ratio values C6 and C5 respectively. This quantity is provided as the input of the (LPCSSPR) target table 258 which is illustratively a two-dimensional table populated with values that produces a low-pressure compressor steady-state pressure ratio target, LPCSSPRT, based on the bounded LPCFT value produced by the MIN block 254. The output, LPCSSPRT, produced by the table 258 is provided as a "false" input of the true/false block 248.

Figure 9:
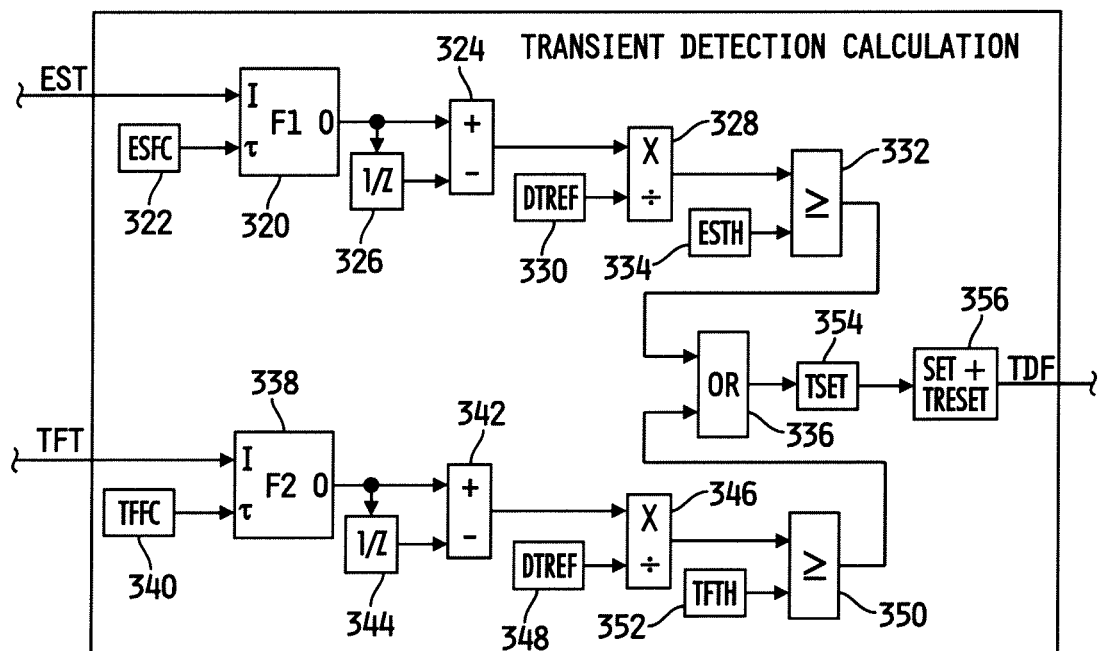
FIG. 9 is a block diagram of one illustrative embodiment of the transient detection calculation block illustrated in FIG. 7.

The control input of the true/false block 248 receives a transient detection flag, TDF, produced by a transient detection calculation block 260 which receives as inputs the engine speed target, EST, and the total fuel target, TFT, produced by the combustion parameter to air handling reference generation model 160 of FIG. 4. Referring now to FIG. 9, one illustrative embodiment of the transient detection calculation block 260 is shown. In the illustrated embodiment, the transient detection calculation block 260 includes a first filter block 320 having a signal input, I, receiving the engine speed target, EST, and a filter constant input, T, receiving an engine speed transient detection filter constant, ESFC, stored in a memory location 322. Illustratively, the filter block 320 represents a first-order low-pass filter, although this disclosure contemplates that the filter block 320 may alternatively represent any nth-order filter, wherein n may be any positive integer. In any case, the output of the filter block 320 is provided to an addition input of a summation block 324 and to an input of a delay block 326. The output of the delay block 326 is provided to a subtraction input of the summation block 324 such that the output of the delay block is the difference between a present and a previous or preceding value of the filtered engine speed target, EST. The output of the summation block 324 is provided to a multiplication input of an arithmetic block 328, and a division input of the arithmetic block receives a constant, DTREF, stored in a memory location 330. Illustratively, the constant DTREF represents a reference time differential such that the output of the arithmetic block 328 represents an approximated derivative of the filtered engine speed target, EST. The output of the arithmetic block 328 is provided as one input of another arithmetic block 332 having another input receiving a constant, ESTH, stored in a memory location 334. Illustratively, the constant ESTH represents a transient detection engine speed threshold, and the arithmetic block 328 is a greater-than-or-equal-to block such that the output of the block 332 is "1" as long as this quantity is greater than or equal to ESTH and is otherwise "0." The output of the arithmetic block 332 is provided as one input of an OR block 336.

The transient detection calculation block 260 further includes a second filter block 338 having a signal input, I, receiving the total fuel target, TFT, and a filter constant input, r, receiving a total fuel transient detection filter constant, TFFC, stored in a memory location 340. Illustratively, the filter block 338 represents a first-order low-pass filter, although this disclosure contemplates that the filter block 338 may alternatively represent any nth-order filter, wherein n may be any positive integer. In any case, the output of the filter block 338 is provided to an addition input of a summation block 342 and to an input of a delay block 344. The output of the delay block 344 is provided to a subtraction input of the summation block 342 such that the output of the delay block is the difference between a present and a previous or preceding value of the filtered total fuel target, TFT. The output of the summation block 342 is provided to a multiplication input of an arithmetic block 346, and a division input of the arithmetic block 346 receives the constant, DTREF, stored in a memory location 348. Illustratively, the constant DTREF is as described above such that the output of the arithmetic block 346 represents an approximated derivative of the filtered total fuel target, TFT. The output of the arithmetic block 346 is provided as one input of another arithmetic block 350 having another input receiving a constant, TFTH, stored in a memory location 352. Illustratively, the constant TFTH represents a transient detection total fuel threshold, and the arithmetic block 350 is a greater-than-or-equal-to block such that the output of the block 350 is "1" as long as this quantity is greater than or equal to TFTH and is otherwise "0." The output of the arithmetic block 350 is provided as another input of the OR block 336.

The output of the arithmetic block 328 illustratively represents the time rate of change of the engine speed target, EST, and the output of the arithmetic block 346 represents the time rate of change of the total fuel target, TFT. If either time rate of change is equal to or exceeds its respective threshold (ESTH for the engine speed target, EST, and TFTH for the total fuel target, TFT), this indicates detection of a transient event of the target engine control parameter(s), and the output of the OR block 336 is a "1." If both time rates of change are less then their respective threshold (ESTH for the engine speed target, EST, and TFTH for the total fuel target, TFT), then the change in EST and TFT are not sufficient to indicate a transient event and the output of the OR block 336 is zero. Thus, the output of the OR block 336 is set, e.g., is a "1," if a transient event in the target engine control parameter(s) EST and/or TFT is detected, and if not the output of the OR block is reset or "0." The output of the OR block 336 is passed through TSET and SET+TRESET blocks 354 and 356 to provide desired turn on and turn off delays respectively of the transient detection flag, TDF: which is the output of the SET+TRESET block 356.

Referring again to FIG. 7, the output, TDF, of the transient detection calculation block 260 is provided to the control input of the true/false block 248, and the output of the true/false block 248 is provided as one input of a MAX block 262. If the transient detection calculation block 260 detects a transient event in one or more of the target engine control parameters, i.e., in EST or TFT, TDF=1 and the output of the true/false block 248 is the low-pressure transient pressure ratio target, LPCTPRT, produced by the table 248. If instead the transient detection calculation block 260 does not detect a transient event in any of the one or more target engine control parameters, i.e., in either of EST or TFT, TDF=0 and the output of the true/false block 248 is the low-pressure steady-state pressure ratio target, LPCSSPRT, produced by the table 258. Thus, if a transient event in one or more of the target engine control parameters is detected, the true/false block 248 produces a transient low-pressure compressor pressure ratio target, and if a transient event in all of the one or more target engine control parameters is not detected, steady-state conditions are assumed and the true/false block 248 produces a steady-state low-pressure compressor pressure ratio target.

The low-pressure compressor corrected flow target, LPCCFT, produced at the output of the arithmetic block 212 is also provided to one input of a MAX block 266 having another input receiving a constant, C7, stored in a memory location 268. The output of the MAX block 266 is provided to one input of a MIN block 270 having another input receiving a constant C8 stored in a memory location 272. The output of the MIN block 270 is provided as an input to a low-pressure compressor pressure ratio (LPCPR) lower limit table 274. In the embodiment illustrated in FIG. 7, the constant C7 illustratively represents a minimum value of LPCCFT and the constant C8 illustratively represents a maximum value of LPCCFT, and the quantity MIN{C8, [MAX(C7, LPCCFT)]} produced at the output of the MIN block 270 represents LCPCFT bounded by upper and lower pressure ratio values C8 and C7 respectively. In one embodiment, C7=C1 and C8=C2, although C7 and/or C8 may alternatively be set to other values. In any case, the quantity produced by the MIN block 270 is provided as the input of the LPCPR lower limit table 274 which is illustratively a two-dimensional table populated with values that produces a lower low-pressure compressor pressure ratio limit, LPCPRLL, based on the bounded LPCFT value produced by the MIN block 274. The output, LPCPRLL, produced by the table 274 is provided as one another input of the MAX block 262, and yet another input of the MAX block 262 receives the value 1 stored in a memory location 264. The output of the MAX block 262 is thus bounded at a minimum value of 1, and the maximum value is determined by the values of the LPCCPRLL and the output of the true/false block 248. Generally, if the true/false block 248 produces LPCTPRT in response to detection of a transient event, the output of the MAX block 262 will be LPPCTPRT, and will otherwise be LPCSSPRT, LPCPRLL or 1.

The output of the MAX block 262 is provided as another input of the MIN block 234, and the output of the MIN block 234 is the low-pressure pressure ratio target, LPCPRT, produced by the LPC pressure ratio target calculation block 180. The pressure ratio target LPCPRT produced by the LPC pressure ratio target calculation block 180 will typically be LPCTPRT during transient events and LPCSSPRT during steady-state conditions, each subject to the pressure ratio limits imposed by the LPC pressure ratio temperature limit, LPCPRTL, and the upper and lower pressure ratio limits LPCPRUL and LPCPRLL respectively. The low-pressure pressure ratio target, LPCRT, represents an initial target low-pressure compressor ratio, and the low-pressure compressor outlet temperature target, LPCOTT, represents an initial target low-pressure compressor outlet temperature.

Figure 10:
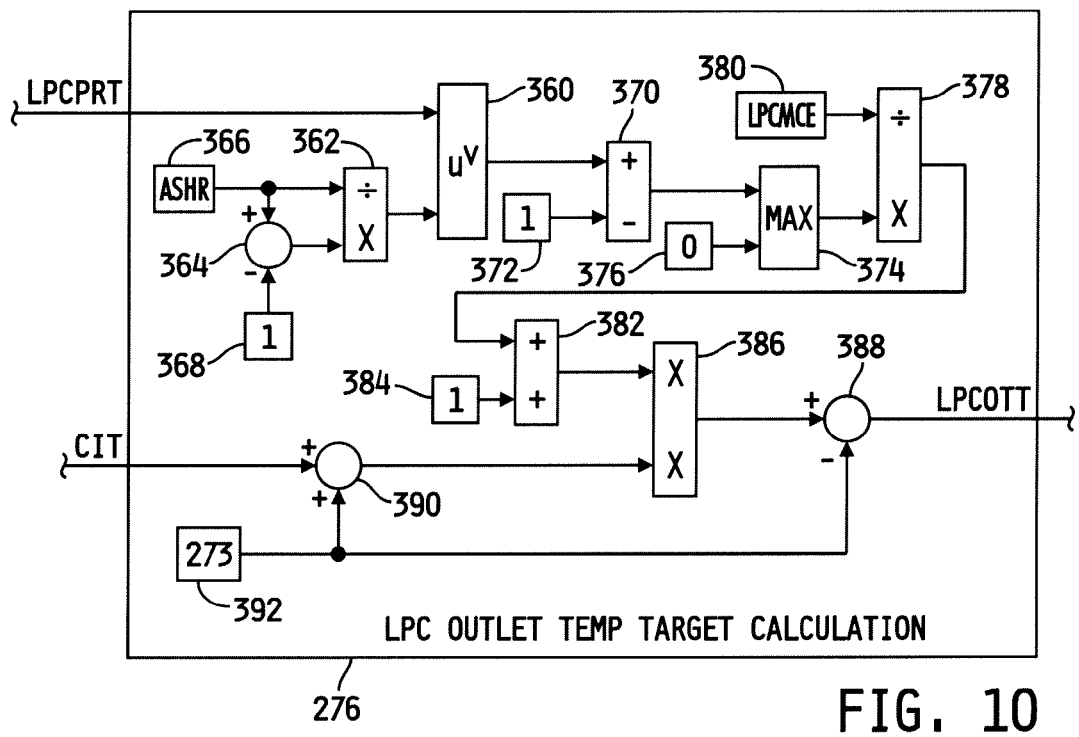
FIG. 10 is a block diagram of one illustrative embodiment of the LPC outlet temperature calculation block illustrated in FIG. 7.

The low-pressure pressure ratio target, LPCPRT produced by the LPC pressure ratio target calculation block 180 is also provided as an input to a low-pressure compressor outlet temperature target calculation block 276 which produces as an output a target value of the outlet temperature of the low-pressure compressor based on LPCPRT and CIT, wherein this target value is represented in FIG. 7 by a low-pressure compressor outlet temperature target, LPCOTT. Referring now to FIG. 10, one illustrative embodiment of the LPC outlet temperature target calculation block 276 is shown. In the illustrated embodiment, the LPC outlet temperature target calculation block 276 includes an arithmetic block 360 having one input receiving the low-pressure compressor pressure ratio target value, LPCPRT, produced by the MIN block 234 of FIG. 7. Another input of the arithmetic block receives the output of another arithmetic block 362 having a division input receiving the air specific heat ratio constant, AHSR, described above and stored in a memory location 366. A multiplication input of the arithmetic block 362 receives the output of a summation node having an addition input receiving ASHR and a subtraction input receiving the value 1 stored in a memory location 368. The output of the arithmetic block 360 is thus $LPCPRT^{[ASHR/ASHR-1)]}$. The output of the arithmetic block 360 is provided to an addition input of a summation block 370 having a subtraction input receiving the constant 1 stored in a memory location 372. The output of the summation block 370 is provided as an input of a MAX block 374 having another input receiving the constant 0 stored in a memory location 376. The output of the MAX block 374 is provided to a multiplication input of an arithmetic block 378 having a division input receiving a constant LPCMCE stored in a memory location 380. Illustratively, the constant LPCMCE represents a mean compressor efficiency value of the low-pressure compressor 24. If the output of the summation block 370 is greater than zero, the output of the arithmetic block 378 is thus $\{LPCPRT^{[ASHR/(ASHR-1)]}-1\}/LPCMCE$, and if the output of the summation block 370 is less than or equal to zero, the output of the arithmetic block 378 is 0.

The output of the arithmetic block 378 is provided to an addition input of a summation block 382 having another addition input receiving the constant 1 stored in a memory location 384. The output of the summation block 382 is provided to one input of a multiplication block 386 having another input receiving the output of a summation node 390. One addition input of the summation node 390 receives the low-pressure compressor inlet temperature value, CIT, and another addition input of the summation node 390 receives the constant 273 stored in a memory location 392, which is also provided to a subtraction input of another summation node 388. The output of the multiplication block 386 is provided to an addition input of the summation node 388, and the output of the summation node 388 is the low-pressure compressor outlet temperature target, LPCOTT, produced by the LPC outlet temperature target calculation block 276. If the output of the arithmetic block 370 is greater than zero, $LPCOTT=\{[\{LPCPRT^{[ASHR/(ASHR-1)]}-1\}/LPCMCE+1]*(CIT+273)\}-273$, which will typically be the case under transient operating conditions of the one or more target engine control parameters, and if the output of the arithmetic block 370 is less than or equal to zero, LPCOTT=CIT, which will generally be the case under steady-state operating conditions of each of the one or more target engine control parameters.

Figure 11:
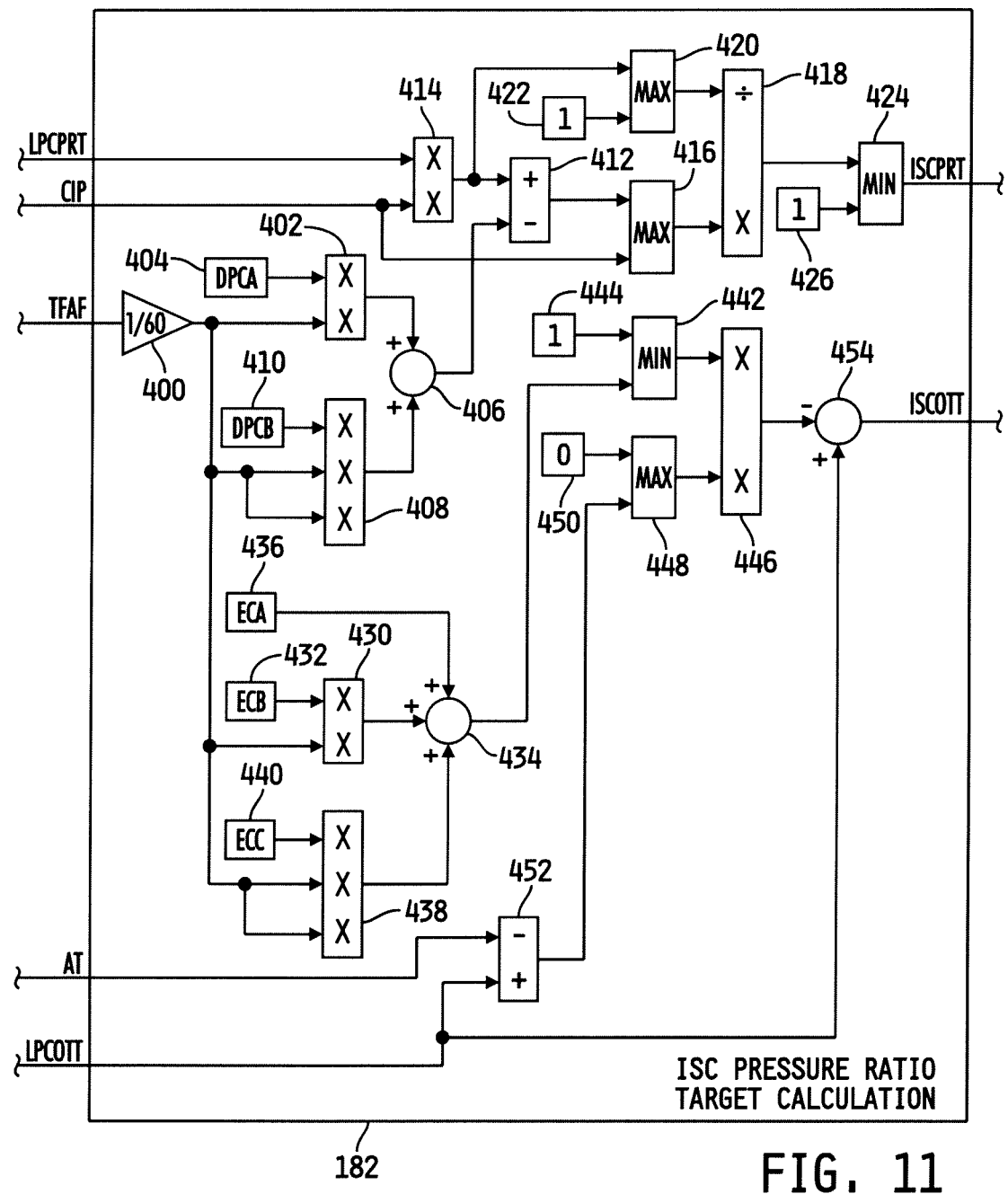
FIG. 11 is a block diagram of one illustrative embodiment of the ISC pressure ratio target calculation block illustrated in FIG. 5.

Referring now to FIG. 11, one illustrative embodiment of the ISC pressure ratio target calculation block 182 of FIG. 5 is shown. In the illustrated embodiment, the ISC pressure ratio target calculation block 182 includes a multiplication block 400 receiving as an input the target fresh air flow rate, TFAF, produced by the combustion parameter to air handling reference generation model 160 (FIG. 4) and producing as an output the value TFAF/60. The output of the multiplication block 400 is provided as an input to a multiplication block 402 having another input receiving a constant, DPCA, stored in a memory location 404. Illustratively, DPCA represents a first ISC delta-pressure coefficient A, and the output of the multiplication block 402 is provided as an addition input to a summation node 406. The output of the multiplication block 400 is also provided as first and second inputs to another multiplication block 408 having a third input receiving a constant, DPCB, stored in a memory location 410. Illustratively, DPCB represents a second ISC delta-pressure coefficient B, and the output of the multiplication block 408 is provided as another addition input to the summation node 406. The output of the summation node, (TFAF/60)*[DPCA+DPCB*(TFAF/60)], is provided as a subtraction input to a summation block 412 having an addition input receiving the output of a multiplication block 414. The output of the summation block 412 is provided to one input of a MAX block 416. One input of the multiplication block 414 receives the low-pressure compressor pressure ratio target, LPCPRT, and another input of the multiplication block 414 receives the low-pressure compressor inlet pressure, CIP, and the output of the summation block 412 is thus the quantity (LPCPRT*CIP)−(TFAF/60)*[DPCA+DPCB*(TFAF/60)]. CIP is also provided to another input of the MAX block 416. The output of the multiplication block 414 is also provided to one input of a MAX block 420 having another input receiving the constant 1 stored in a memory location 422. The output of the MAX block 420 is provided to a division input of an arithmetic block 418 having a multiplication input receiving the output of the MAX block 416. The output of the arithmetic block is thus the quantity {[(LPCPRT*CIP)−(TFAF/60)*[DPCA+DPCB*(TFAF/60)]}/(LPCPRT*CIP) if the quantity (LPCPRT*CIP)−(TFAF/60)*[DPCA+DPCB*(TFAF/60)] is greater than CIP and if the quantity (LPCPRT*CIP) is greater than 1. If the quantity (LPCPRT*CIP)−(TFAF/60)*[DPCA+DPCB*(TFAF/60)] is less than or equal to CIP and the quantity (LPCPRT*CIP) is greater than 1, the output of the arithmetic block 418 is CIP/(LPCPRT*CIP). If the quantity (LPCPRT*CIP)−(TFAF/60)*[DPCA+DPCB*(TFAF/60)] is greater than CIP and the quantity (LPCPRT*CIP) is less than or equal to 1, the output of the arithmetic block 418 is (LPCPRT*CIP)−(TFAF/60)*[DPCA+DPCB*(TFAF/60)]. Finally, if the quantity (LPCPRT*CIP)−(TFAF/60)*[DPCA+DPCB*(TFAF/60)] is less than or equal to CIP and the quantity (LCPPRT*CIP) is less than or equal to 1, the output of the arithmetic block 418 is CIP. In any case, the output of the arithmetic block 418 is provided to one input of a MIN block 424 having another input receiving the constant 1 stored in a memory location 426. The output of the MIN block 424 is the inter-stage cooler pressure ratio target, ISCPRT, and has the value of one of the four possibilities of the output of the arithmetic block 418 just described as long as that value is less than 1, and is otherwise 1.

The ISC pressure ratio target calculation block 182 also includes a multiplication block 430 receiving as one input the quantity TFAF/60 produced by the multiplication block 400. Another input of the multiplication block 430 receives a constant, ECB, stored in a memory location 432. Illustratively, ECB represents a first ISC effectiveness coefficient B, and the output of the multiplication block 430 is provided to an addition input to a summation node 434. Another addition input of the summation node 434 receives another constant, ECA, stored in a memory location 436. Illustratively, ECA represents a second ISC effectiveness coefficient A. The output of the multiplication block 400 is also provided as first and second inputs of another multiplication block 438 having a third input receiving another constant, ECC, stored in a memory location 440. Illustratively, ECC represents a third ISC efficiency coefficient C, and the output of the multiplication block 438 is provided as another addition input of the summation node 434. The output of the summation node 434, ECA+(TFAF/60)*[(ECB+ECB*(TFAF/60)], is provided as one input of a MIN block 442 having another input receiving the constant 1 stored in a memory location 444. The output of the MIN block 442 is provided to one input of a multiplication block 446. Another input of the multiplication block 446 receives the output of a MAX block 448 having one input receiving the constant 0 stored in a memory location 450 and having another input receiving the output of a summation block 452. A subtraction input of the summation block 452 receives the ambient temperature, AT, and an addition input of the summation block 452 receives the low-pressure compressor outlet temperature target, LPCOTT, produced by the LPC pressure ratio target calculation block 180. LPCOTT is also provided to an addition input of a summation node 454 having a subtraction input receiving the output of the multiplication block 446. The output of the summation node 454 is the inter-stage cooler outlet temperature target, ISCOTT, produced by the ISC pressure ratio target calculation block 182. If the quantity ECA+(TFAF/60)*[(ECB+ECB*(TFAF/60)] produced by the summation node 434 is less than 1 and the quantity (LPCOTT−AT) produced by the summation block 452 is greater than zero, ISCOTT=LPCOTT−{ECA+(TFAF/60)*[(ECB+ECB*(TFAF/60)]}*(LPCOTT−AT). If the quantity ECA+(TFAF/60)*[(ECB+ECB*(TFAF/60)] produced by the summation node 434 is less than 1 and the quantity (LPCOTT−AT) produced by the summation block 452 is less than or equal to zero, ISCOTT=LPCOTT. If the quantity ECA+(TFAF/60)*[(ECB+ECB*(TFAF/60)] produced by the summation node 434 is greater than or equal to 1 and the quantity (LPCOTT−AT) produced by the summation block 452 is greater than zero, LPCOTT=AT. Finally, if the quantity ECA+(TFAF/60)*[(ECB+ECB*(TFAF/60)] produced by the summation node 434 is greater than or equal to 1 and the quantity (LPCOTT−AT) produced by the summation block 452 is less than or equal to zero, ISCOTT=LPCOTT.

Figure 12:
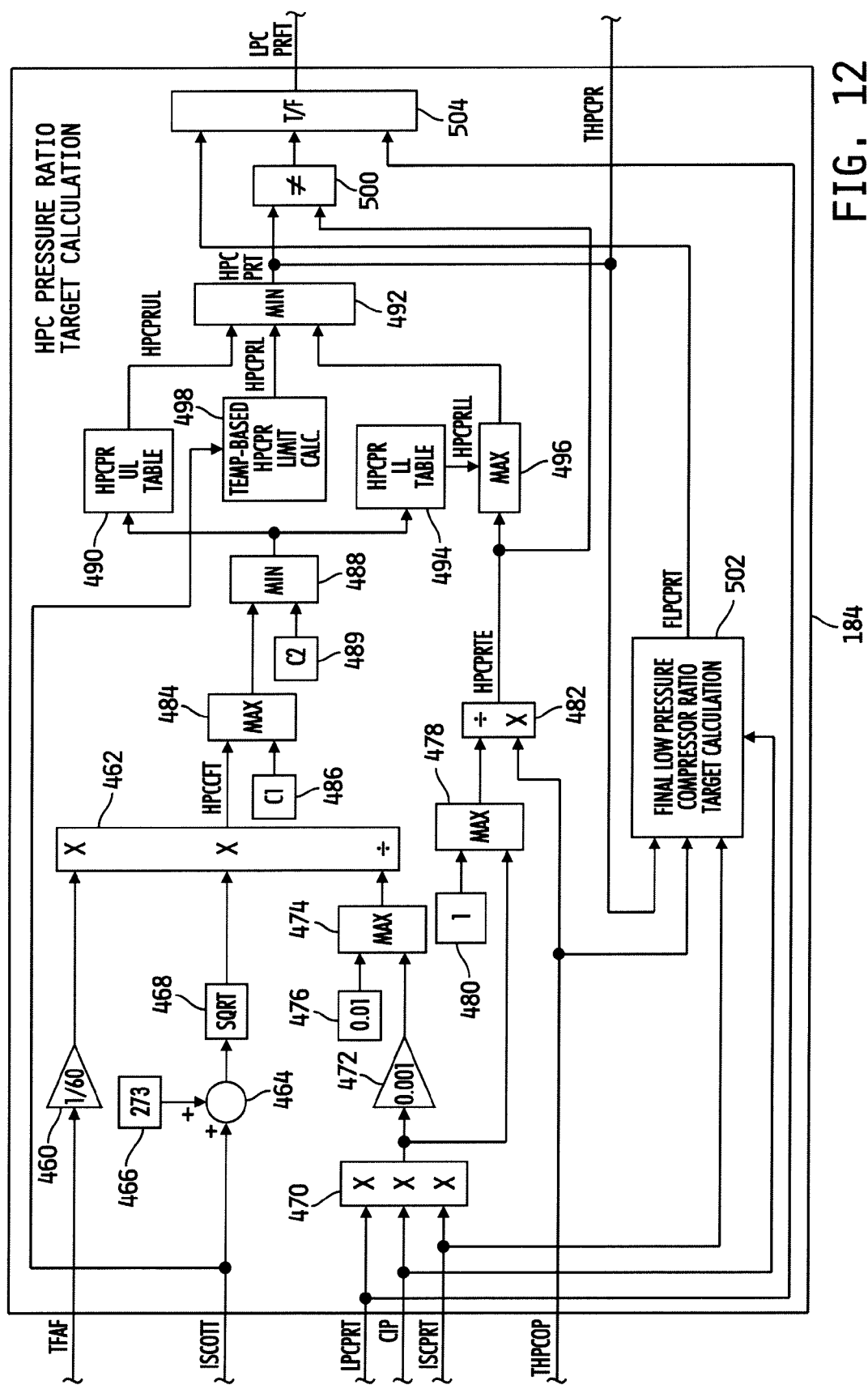
FIG. 12 is a block diagram of one illustrative embodiment of the HPC pressure ratio target calculation block illustrated in FIG. 5.

Referring now to FIG. 12, one illustrative embodiment of the HPC pressure ratio target calculation block 184 of FIG. 5 is shown. In the illustrated embodiment, the HPC pressure ratio target calculation block 184 includes a multiplication block 460 receiving as an input the target fresh air flow rate, TFAF, and producing as an output the quantity TFAF/60. The output of the multiplication block 460 is provided to a multiplication input of an arithmetic block 462. Another multiplication input of the arithmetic block 462 receives the output of a square-root calculation block 468 which receives as an input the output of a summation node 464. One input of the summation node 464 receives as an input the inter-stage cooler outlet temperature target, ISCOTT, and another input of the summation node 464 receives the constant 273 stored in a memory location 466. The output of the square-root calculation block 468 is thus the quantity SQRT(ISCOTT+273). An arithmetic block 470 has three inputs receiving as inputs the low-pressure compressor pressure ratio target, LPCPRT, the low-pressure compressor inlet pressure, CIP, and the inter-stage cooler pressure ratio target, ISCPRT. The arithmetic block 470 is illustratively a multiplication block, and the output of the arithmetic block 470 is thus the quantity LPCPRT*CIP*ISCPRT. The output of the arithmetic block 470 is provided as an input to a multiplication block 472, and the output of the multiplication block 472 is [0.001*LPCPRT*CIP*ISCPRT]. In embodiments of the system 10 that do not include an inter-stage cooler 25, the ISCPRT input may be omitted, in which case the value of the multiplier in block 472 may be suitably adjusted. Alternatively, the LPCPRT input may in such embodiments be also be provided to the ISCPRT input such that the output of the output of the multiplication block 472 is [0.001*LPCPRT$^2$*CIP]. In any case, the output of the multiplication block 472 is provided as an input to a MAX block 474 having another input receiving the constant 0.01 stored in a memory location 476. The output of the MAX block 474 is provided to a division input of the arithmetic block 462. The output of the arithmetic block 462 is thus the quantity (TFAF/60)*[SQRT(ISCOTT+273)]/[0.001*LPCPRT*CIP*ISCPRT].

The output of the arithmetic block 462 is provided to one input of a MAX block 484 having another input receiving the constant C1 stored in a memory location 486. The output of the MAX block is provided to one input of a MIN block 488 having another input receiving the constant C2 stored in a memory location 489. The output of the MIN block 488 is provided to inputs of a high-pressure compressor pressure ratio upper limit (HPCPRUL) table 490 and a high-pressure compressor pressure ratio lower limit (HPCPRLL) table 494. The output of the HPCPRUL table 490 is provided to one input of a MIN block 492, and the output of the HPCPRLL table 494 is provided to one input of a MAX block 496. In the embodiment illustrated in FIG. 12, the output of the arithmetic block 462 represents a high-pressure compressor corrected flow target, HPCCFT. The constant C1 illustratively represents a minimum value of HPCCFT and the constant C2 illustratively represents a maximum value of HPCCFT, and the quantity MIN{C2, [MAX(C1, HPCCFT)]} produced at the output of the MIN block 488 represents HCPCFT bounded by upper and lower pressure ratio values C2 and C1 respectively. This quantity is provided as the input of the HPCPR upper limit table 490 which is illustratively a two-dimensional table populated with values that produces an upper high-pressure compressor pressure ratio limit, HPCPRUL, based on the bounded HPCFT value produced by the MIN block 488. The quantity produced at the output of the MIN block 488 is also provided as the input of the HPCPR lower limit table 494 which is illustratively a two-dimensional table populated with values that produces a lower high-pressure compressor pressure ratio limit, HPCPRLL, based on the bounded HPCFT value produced by the MIN block 488. The output, HPCPRLL, produced by the table 494 is provided as one input of a MAX block 496 having one input receiving the output of an arithmetic block 482 and an output provided to another input of the MIN block 492.

The output of the arithmetic block 470 is also provided to one input of a MAX block 478 having another input receiving the constant 1 stored in a memory location 480. The output of the MAX block 478 is provided to a division input of the arithmetic block 482, and a multiplication input of the arithmetic block 482 receives the target high pressure compressor outlet pressure, THPCOP, produced by the combustion parameter to air handling reference generation model 160 of FIG. 4. The output of the arithmetic block 482 is the quantity HPCPRTE (high pressure compressor pressure ratio target estimate), and the output of the MAX block 496 is MAX (HPCPRTE, HPCPRLL), which represents a lower high-pressure compressor pressure ratio limit provided to the MIN block 492.

A temperature-based high-pressure compressor pressure ratio limit calculation block 498 receives as an input the target fresh air flow rate, TFAF, and produces as an output a temperature based high-pressure compressor pressure ratio limit, HPCPRTL. Illustratively, the temperature-based high pressure compressor pressure ratio limit block 498 is provided in the form illustrated in FIG. 8 in which the memory location 288 has stored therein a high-pressure compressor outlet temperature upper limit, the output of the arithmetic block 284 produces a high-pressure compressor temperature ratio, HPCTR, the mean compressor efficiency constant stored in the memory 300 represents a high-pressure compressor efficiency constant, and the output of the arithmetic block 306 is the temperature based high-pressure compressor pressure ratio limit, HPCPRTL. The temperature based high-pressure compressor pressure ratio limit, HPCPRTL, is provided as another input to the MIN block 492, and the output of the MIN block 492 is the minimum of HPCPRUL, HPCPRTL and the output of the MAX block 496. The output of the MIN block 492 represents a high-pressure compressor pressure ratio target, HPCPRT, and is provided to one input of an arithmetic block 500. The output of the arithmetic block 482 represents another high-pressure compressor pressure ratio target estimate, HPCPRTE, and is provided as another input of the arithmetic block 500. The arithmetic block 500 is configured as a comparison block NOTEQUAL(HPCPRT, HPCPRTE) which compares the two inputs and generates "1" representing a true flag if both inputs are unequal or generates "0" representing a false flag if both inputs are equal. The output of the arithmetic block 500 is provided as a control input of a true/false block 504. The "true" input of the true/false block 504 is the output, FLPCPRT, of a final low-pressure compressor pressure ratio target calculation block 502, and the "false" input of the true/false block 504 is the low-pressure compressor pressure ratio target, LPCPRT, produced by the LPC pressure ratio target calculation block 180. The output of the true/false block 504 is the low-pressure pressure ratio final target, LPCPRFT, produced by the HPC pressure ratio target calculation block 184.

Figure 13:
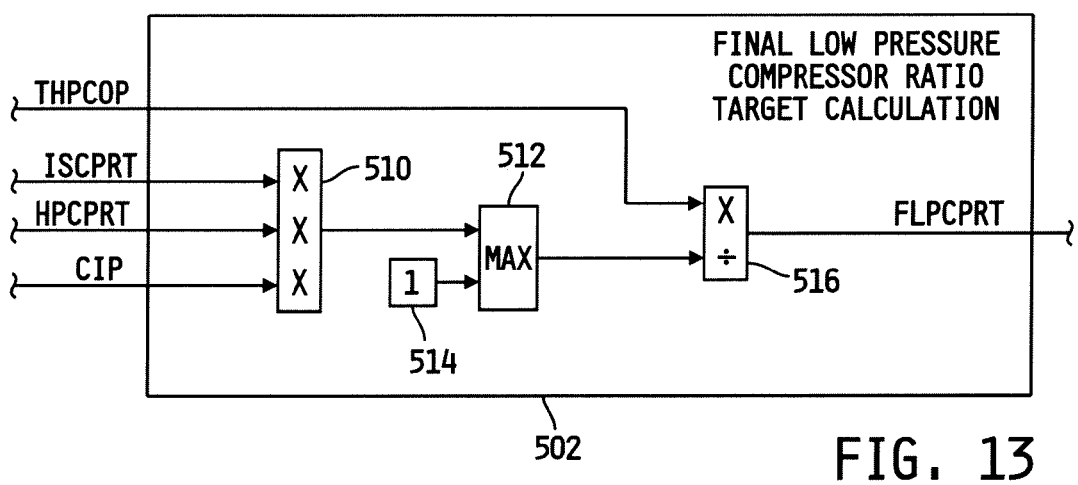
FIG. 13 is a block diagram of one illustrative embodiment of the final low-pressure ratio target calculation block illustrated in FIG. 12.

The high-pressure compressor pressure ratio target, HPCPRT, produced by the MIN block 492 is the target high-pressure compressor pressure ratio, THPCPR, produced by the HPC pressure ratio target calculation block 184. The final low-pressure compressor pressure ratio target calculation block 502 receives as inputs the target high-pressure compressor pressure ratio, THPCPR, the target high-pressure compressor outlet pressure, THPCOP, the inter-stage compressor pressure ratio target, ISCPRT, and the low-pressure compressor inlet pressure, CIP. Referring now to FIG. 13, one illustrative embodiment of the final low-pressure compressor pressure ratio target calculation block 502 is shown. In the illustrated embodiment, the final low-pressure compressor pressure ratio target calculation block 502 includes a multiplication block 510 receiving as inputs the inter-state cooler pressure ratio target, ISCPRT, produced by the ISC pressure ratio target calculation block 182, the high-pressure compressor pressure ratio target, HPCPRT, produced by the MAX block 492 of FIG. 12, and the low-pressure compressor inlet pressure, CIP, and produces as an output the product of these three quantities ISCPRT*HPCPRT*CIP. In embodiments of the system 10 that do not include an inter-stage cooler 25, the ISCPRT input may be omitted such that the output of the multiplication block 510 is [LPCPRT*CIP]. In any case, the output of the multiplication block 510 is provided to one input of a MAX block 512 having another input which receives the constant 1 stored in a memory location 514. The output of the MAX block 512 is provided to a division input of an arithmetic block 516 having a multiplication input which receives the target high-pressure compressor output pressure, THPCOP, and the output of the arithmetic block is the final low-pressure compressor pressure ratio target, FLPCPRT, which is provided to the "true" input off the true/false block 504 of FIG. 12. The final low-pressure compressor pressure ratio target, FLPCPRT, is thus the product of the inter-stage cooler pressure ratio target, ISCPRT, and the high-pressure compressor pressure ratio target, HPCPRT, and the total compressor pressure ratio of the dual-stage turbocharger 18 which is the target compressor pressure ratio across the combination of both compressors 24 and 16. The target compressor pressure ratio across the combination of both compressors is, by definition, the target compressor pressure at the outlet of the downstream, or high-pressure compressor 16, and the pressure at the inlet of the upstream, or low-pressure compressor 24, or THPCOP/CIP.

The compressor work-split control strategy illustrated in FIGS. 5-12 operates to compute the target low-pressure compressor ratio, TLPCPR, and the target high-pressure compressor ratio, THPCPR, by computing two estimates for the target high-pressure compressor ratio. With reference to FIG. 12, the first estimate is an unadjusted high-pressure compressor ratio target which is the high-pressure compressor pressure ratio target estimate, HPCPRTE, produced by the arithmetic block 482. The second is a temperature-based high-pressure compressor ratio, which is the high-pressure compressor pressure ratio target, HPCPRT, produced by the MIN block 492. This second estimate, HPCPRT, is produced by the compressor work-split control strategy 162 as the target high-pressure compressor ratio, THPCPR. To determine the corresponding target low-pressure compressor ratio target, TLPCPR, the two high-pressure compressor pressure ratio target estimates HPCPRTE and HPCPRT are compared (block 500) to determine whether they are equal (block 500). If so, this means that the unadjusted high-pressure compressor ratio target is consistent with the turbine operation and can be achieved under the current target temperature conditions and the true/false block 504 selects as the low-pressure compressor pressure ratio final target, LPCPRFT, the initial target low-pressure compressor ratio, LPCPRT, produced by the LPC pressure ratio target calculation block 180. If not, this means that the unadjusted high-pressure ratio target is not consistent with the turbine operation and/or cannot be achieved under the current target temperature conditions, and the target low-pressure compressor pressure ratio must be modified so that the overall pressure ratio between the air inlet of the low-pressure compressor 24 and the air outlet of the high-pressure compressor 16 is equal to the target overall compressor pressure ratio. This modification is carried out by the final low-pressure compressor ratio target calculation block 502, which produces the final low-pressure compressor pressure ratio target value, FLPCPRT, provided to the "true" input of the true/false block 504. Thus, if the two high-pressure compressor pressure ratio target estimates HPCPRTE and HPCPRT are not equal, the true/false block 504 selects as the low-pressure compressor pressure ratio final target, LPCPRFT, the final low-pressure compressor pressure ratio target value, FLPCPRT. In either case, the low-pressure compressor pressure ratio final target, LPCPRFT, is further processed (see FIG. 5) to correct for altitude as a function of ambient pressure, AP, to which the system 10 is exposed, and the output of this correction is the target low-pressure compressor pressure ratio, TLPCPR, produced by the compressor work-split control strategy 162.

Figure 14:
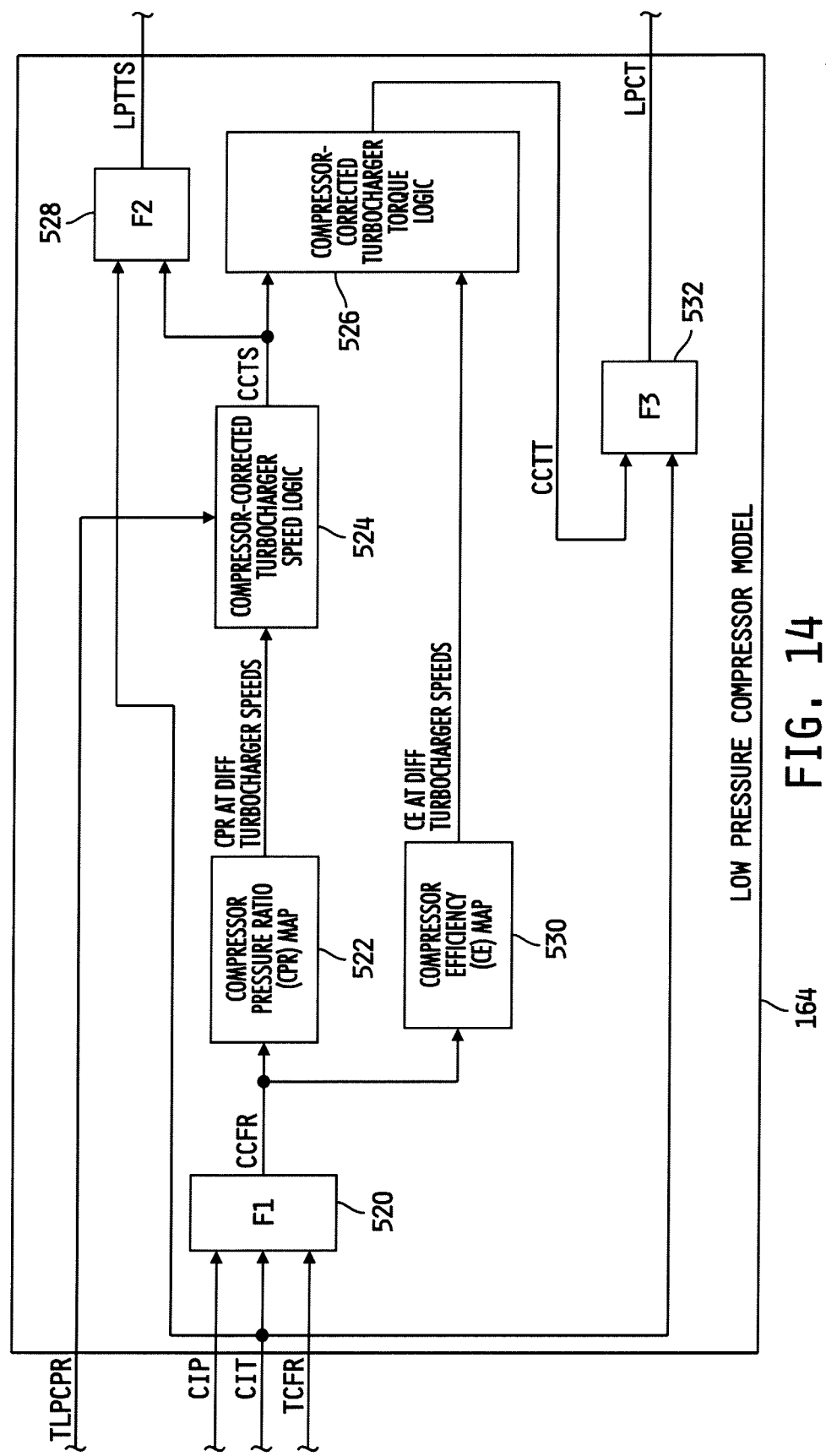
FIG. 14 is a block diagram of one illustrative embodiment of the low-pressure compressor model illustrated in FIG. 4.

Referring now to FIG. 14, one illustrative embodiment of the low-pressure compressor model 164 illustrated in FIG. 4 is shown. In the illustrated embodiment, the low-pressure compressor model 164 includes a function block 520 receiving as inputs the low-pressure compressor inlet pressure, CIP, the low-pressure compressor inlet temperature, CIT, and the target compressor flow rate, TCFR. The function block 520 produces as an output a compressor corrected flow rate CCFR. Illustratively, the function, F1, stored in the function block 520 produces, CCFR, in accordance with the equation CCFR=TCFR*SQRT(CIT/$T_{STD}$)*(CIP/$P_{STD}$), where $T_{STD}$ is a standard reference temperature, e.g., 25 degrees C. or other reference temperature, and $P_{STD}$ is a standard reference pressure, e.g., 101.3 kPa or other reference pressure. Alternatively, this disclosure contemplates other embodiments in which F1 includes more, fewer and/or different input parameters.

The compressor corrected flow rate, CCFR, is provided as an input to nother functional block 522 that illustratively has stored therein a conventional low-pressure compressor pressure ratio map corresponding to the specific configuration of the turbocharger 18. Generally, the compressor pressure ratio map is designed to map values of CCFR to low-pressure compressor pressure ratio values at a plurality of different turbocharger operating speeds. The functional block 522 is illustratively operable to process CCFR using the low-pressure compressor pressure map to generate a number of pairs of low-pressure compressor pressure ratio and turbocharger operating speed values.

Figure 15:
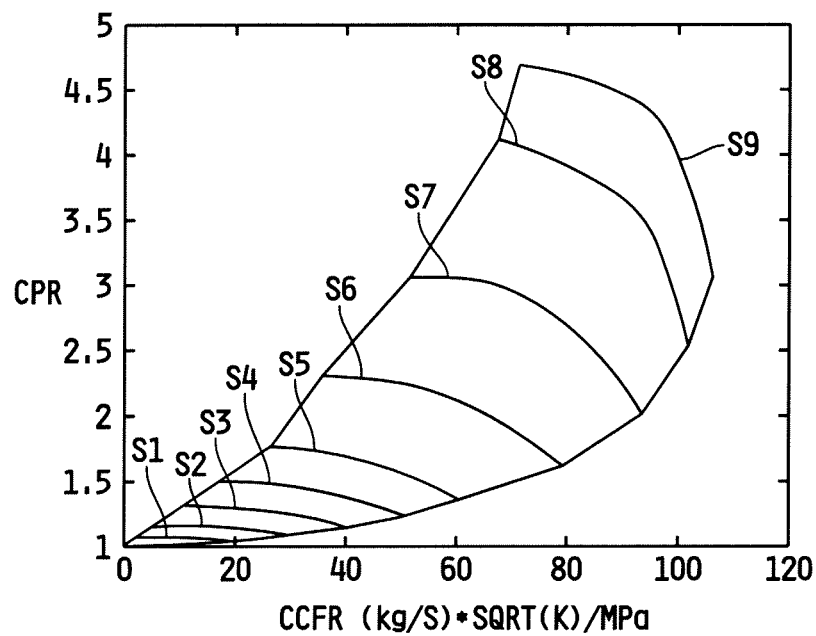
FIG. 15 is a plot of one illustrative example of the compressor pressure ratio map illustrated in FIG. 14.

Referring now to FIG. 15, an example of one such low-pressure compressor pressure ratio map is shown. In the illustrated embodiment, the low-pressure compressor pressure ratio map maps compressor corrected flow rate values, CCFR, to compressor pressure ratio values, CPR, at a plurality of different turbocharger operating speeds, where the contours $S_1$-$S_9$ represent lines of different, constant turbocharger operating speeds. With the compressor pressure ratio map, any one value of CCFR thus produces a number, M, of different compressor pressure ratio, CPR, and turbocharger operating speed, TS, pairs (CPR, TS)$_1$, . . . , (CPR, TS)$_M$, where M may be any positive integer.

Referring again to FIG. 14, the target low-pressure compressor pressure ratio, TLPCPR, produced by the compressor work-split control strategy 162 and the number of pairs of low-pressure compressor pressure ratio and turbocharger operating speed values, (CPR, TS)$_{1-M}$, produced by the functional block 522 are provided as inputs to another functional block 524. The functional block 524 processes the function of at least two of the (CPR, TS)$_{1-M}$ pair values and the TLPCPR value to produce a compressor-corrected turbocharger speed estimate, CCTS. In one embodiment, for example, two of the (CPR, TS)$_{1-M}$ pair values are selected with one pair having a CPR value that is less than TLPCPR and the other pair having a CPR value that is greater than TLPCPR, and a conventional interpolation technique is used to determine a CCTS value that corresponds to TLPCPR. In embodiments in which the function of the two (CPR, TS)$_{1-M}$ pair values is linear, or can be acceptably approximated by a linear function, a conventional linear interpolation technique may be used to determine CCTS. Alternatively, in embodiments in which the function of the two (CPR, TS)$_{1-M}$ pair values is non-linear, a conventional non-linear interpolation technique may be used to determine CCTS.

In another example embodiment, the functional block 524 may be configured to process the number of (CPR, TS)$_{1-M}$ pair values to generate a continuous or piece-wise continuous profile of compressor-corrected turbocharger operating speeds as a function of compressor pressure ratios. The profile may illustratively be linear or non-linear. In this embodiment, the functional block 524 is then operable to map TLPCPR to CCTS using the generated profile. It will be appreciated that one or more other conventional processing techniques may alternatively be used to process the number of (CPR, TS)$_{1-M}$ pair values and TLPCPR to determine CCTS, and any such alternate processing techniques are contemplated by this disclosure.

The low-pressure compressor model 164 illustrated in FIG. 14 further includes another functional block 528 that receives as inputs the low-pressure compressor inlet temperature signal, CIT, and the compressor corrected turbocharger speed estimate, CCTS. The functional block 528 produces as an output an estimate of the low-pressure target turbocharger speed, TTS. Illustratively, the functional block 528 processes CIT and CCTS according to a function F2 to produce an estimate of the low-pressure target turbocharger speed, TTS. The function F2 is illustratively given by the equation TTS=CCTS*SQRT(CIT/$T_{STD}$), where $T_{STD}$ is as described herein above.

The compressor corrected flow rate, CCFR, produced by the functional block 520 is also provided as an input to another functional block 530 that illustratively has stored therein a conventional efficiency map corresponding to the specific configuration of the turbocharger 18. Generally, the compressor efficiency map is designed to map values of CCFR to compressor efficiency (percentage) values at a plurality of different turbocharger operating speeds. The functional block 530 is illustratively operable to process CCFR using the compressor efficiency map to generate a number of pairs of compressor pressure ratio and turbocharger operating speed values.

Figure 16:
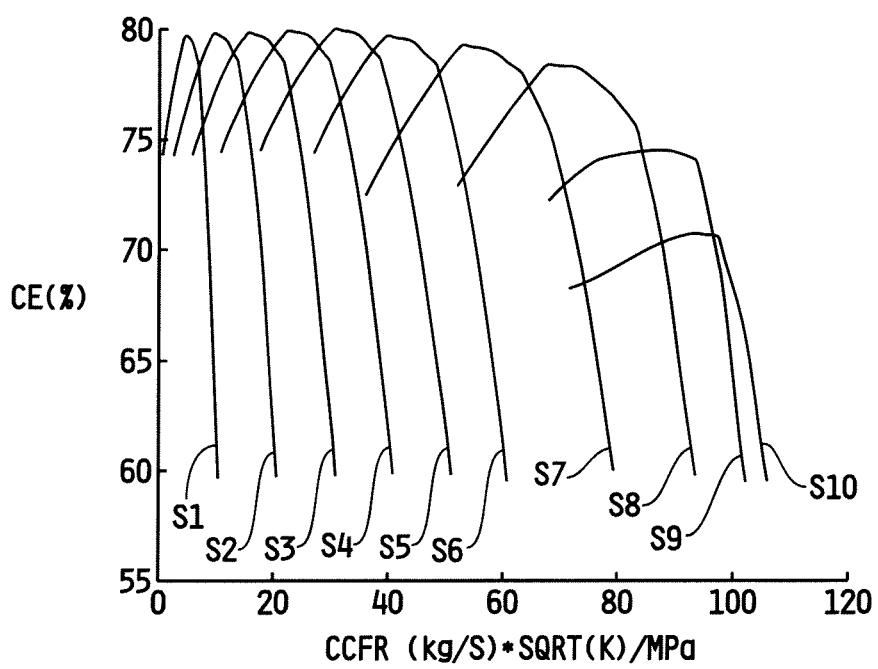
FIG. 16 is a plot of one illustrative example of the compressor efficiency map illustrated in FIG. 14.

Referring now to FIG. 16, an example of one such compressor efficiency map is shown. In the illustrated embodiment, the compressor efficiency map maps compressor corrected flow rate values, CCFR, to compressor efficiency values, CE, at a plurality of different turbocharger operating speeds, where the contours $S_1$-$S_{10}$ represent lines of different, constant turbocharger operating speeds. With the compressor pressure ratio map, any one value of CCFR thus produces a number, K, of different compressor efficiency, CE, and turbocharger operating speed, TS, pairs (CE, TS)$_1$, . . . , (CE, TS)$_K$, where K may be any positive integer.

Referring again to FIG. 14, the compressor corrected turbocharger speed, CCTS, produced by the functional block 524 and the number of pairs of compressor efficiency and turbocharger operating speed values, (CE, TS)$_{1-K}$, produced by the functional block 530 are provided as inputs to another functional block 526. Similarly to the functional block 524, the functional block 526 processes a function of at least two of the (CE, TS)$_{1-K}$ pair values and the CCTS value to produce a low-pressure compressor corrected turbocharger torque estimate, CCTT. In one embodiment, for example, two of the (CE, TS)$_{1-K}$ pair values are selected with one pair having a TS value that is less than CCTS and the other pair having a TS value that is greater than CCTS, and a conventional interpolation technique is used to determine a CCTT value that corresponds to CCTS. In embodiments in which the function of the two (CE, TS)$_{1-K}$ pair values is linear, or can be acceptably approximated by a linear function, a conventional linear interpolation technique may be used to determine CCTT. Alternatively, in embodiments in which the function of the two (CE, TS)$_{1-K}$ pair values is non-linear, a conventional non-linear interpolation technique may be used to determine CCTT. Alternatively still, the functional block 530 may be configured to process the number of (CE, TS)$_{1-K}$ pair values to generate a continuous or piece-wise continuous profile of compressor-corrected turbocharger operating torques as a function of compressor efficiencies, and such a profile can be processed as described above with respect to the functional block 524 to determine CCTT.

Referring again to FIG. 14, the low-pressure compressor model 164 further includes another functional block 532 that receives as inputs the low-pressure compressor inlet temperature signal, CIT, and the compressor corrected turbocharger torque estimate, CCTT. The function block 526 produces as an output an estimate of the low-pressure target compressor torque, LPCT. The functional block 526 illustratively processes CIT and CCTT according to a function F3 to produce an estimate of the low-pressure target compressor torque, LPCT, and in one illustrative embodiment the function F3 is given by the equation LPCT=CCTT*SQRT(CIT/$T_{STD}$), where $T_{STD}$ is as described herein above.

Figure 17:
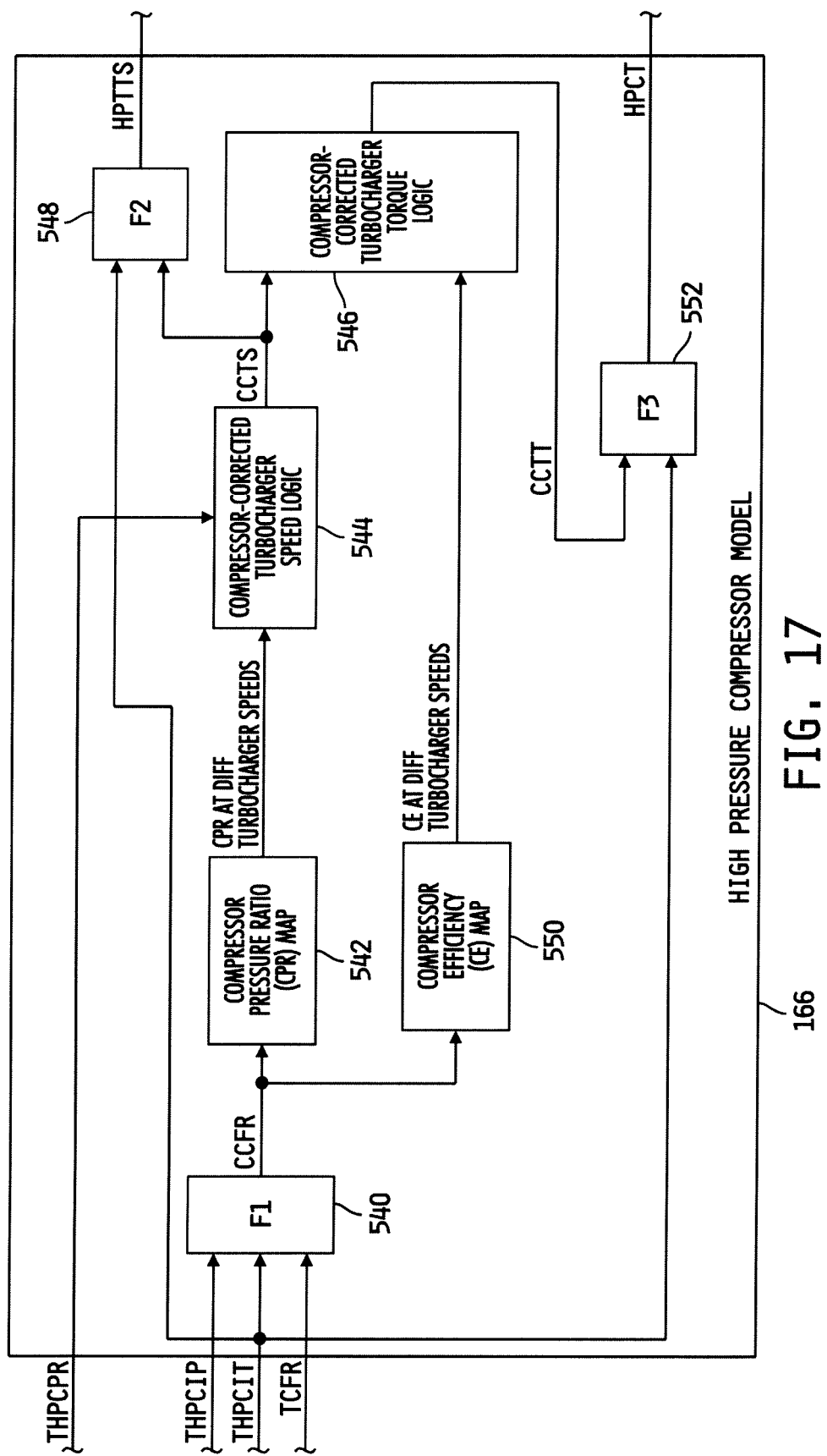
FIG. 17 is a block diagram of one illustrative embodiment of the high-pressure compressor model illustrated in FIG. 4.

Referring now to FIG. 17, one illustrative embodiment of the high-pressure compressor model 166 illustrated in FIG. 4 is shown. In the illustrated embodiment, the high-pressure compressor model 166 is identical to the low-pressure compressor model 164 illustrated in FIGS. 14-16, except that the instead of TLPCPR, CIP and CIT, the high-pressure compressor model 166 receives as inputs the target high-pressure compressor pressure ratio, THPCPR, the target high-pressure compressor inlet pressure, THPCIP, and the target high-pressure compressor inlet temperature, THPCIT, respectively produced by the compressor work-split control strategy as illustrated and described hereinabove. Blocks 540, 542, 544, 546, 548, 550 and 552 are thus identical to blocks 520, 522, 524, 526, 528, 530 and 532 of FIGS. 14-16 except that the blocks in FIG. 17 represent function and logic blocks for the high-pressure compressor 16 rather than the low-pressure compressor 24. The outputs of the high-pressure compressor model of FIG. 17 are accordingly the high-pressure target turbine speed, HPTTS, and the high-pressure compressor torque, HPCT.

Figure 18:
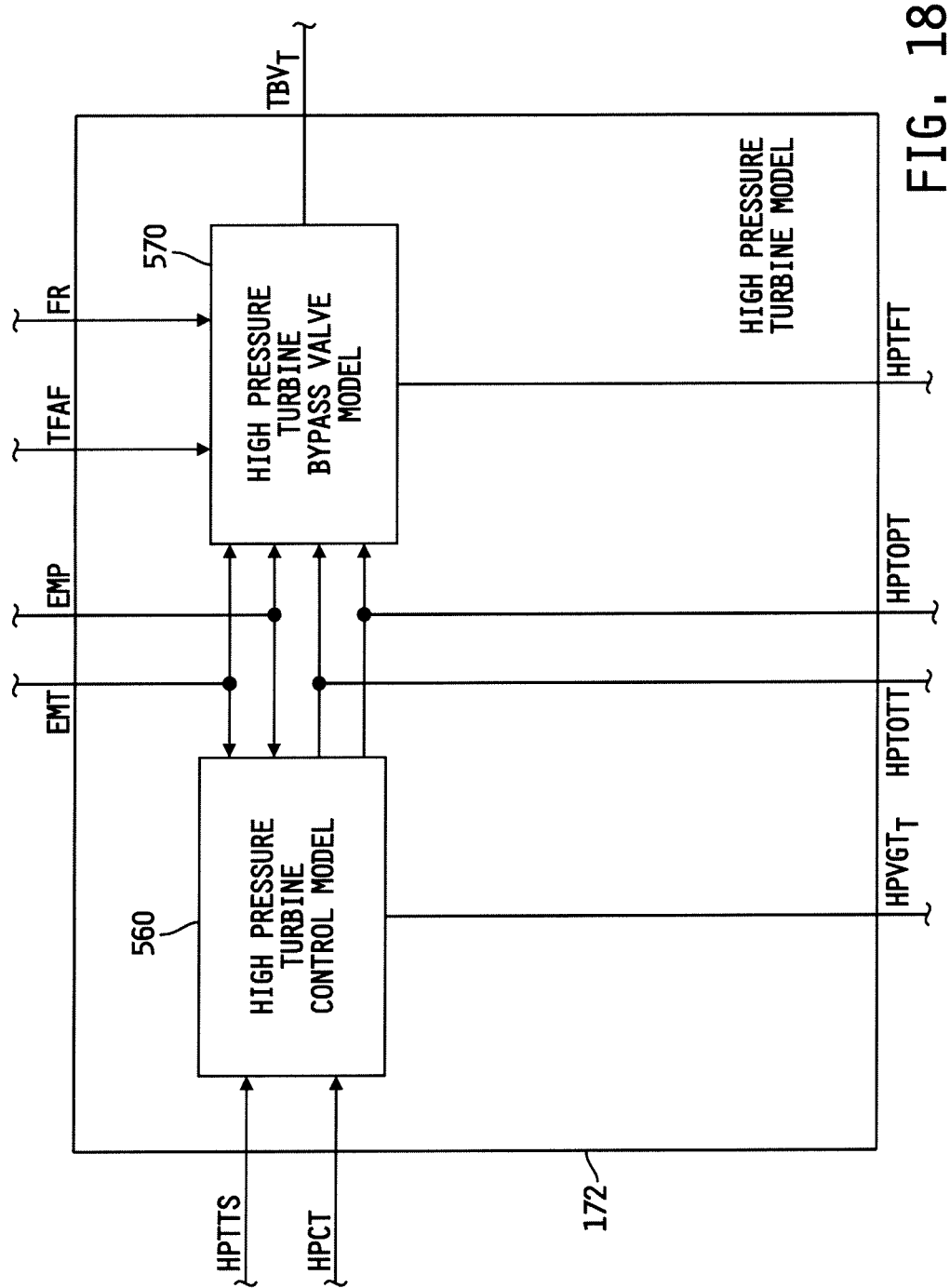
FIG. 18 is a block diagram of one illustrative embodiment of the high-pressure turbine model illustrated in FIG. 4.

Referring now to FIG. 18, one illustrative embodiment of the high-pressure turbine model 172 of FIG. 4 is shown. In the illustrated embodiment, the high-pressure turbine model 172 includes a high-pressure turbine control model 560 and a high-pressure turbine bypass valve model 570. The high-pressure turbine control model 560 receives as inputs the high-pressure turbine target speed, HPTTS, and the high-pressure compressor torque, HPCT, produced by the high-pressure compressor model 166 of FIG. 4, and also receives as inputs the target exhaust manifold temperature, EMT, and the target exhaust manifold pressure, EMP, produced by the cylinder model 168 of FIG. 4. The high-pressure turbine control model 560 processes these input values and produces as outputs the feedforward or target component, $HPVGT_T$ of the high-pressure VGT control signal, HPVGT, produced by the control circuit 60, as well as a high-pressure turbine outlet temperature target, HPTOTT, and a high-pressure turbine outlet pressure target, HPTOPT. Further details relating to one illustrative embodiment of the high-pressure turbine control model 560 will be described hereinafter with respect to FIGS. 19-23.

The high-pressure turbine bypass valve model 570 illustrated in FIG. 18 receives as inputs the target fresh air flow rate, TFAF, and the target fuel rate, FR, produced by the combustion parameter to air handling reference generation model 160, the target exhaust manifold temperature, EMT, and the target exhaust manifold pressure, EMP, produced by the cylinder model 168, as well as the high-pressure turbine outlet temperature target, HPTOTT, and the high-pressure turbine outlet pressure target, HPTOPT, produced by the high-pressure turbine control model 560. The high-pressure turbine bypass valve model 570 processes these input values and produces as outputs the feedforward or target component, $TBV_T$ of the high-pressure turbine bypass valve control signal, TBV, produced by the control circuit 60, as well as a high-pressure turbine flow target, HPTFT. Further details relating to one illustrative embodiment of the high-pressure turbine bypass valve model 570 will be described hereinafter with respect to FIG. 24.

Figure 19:
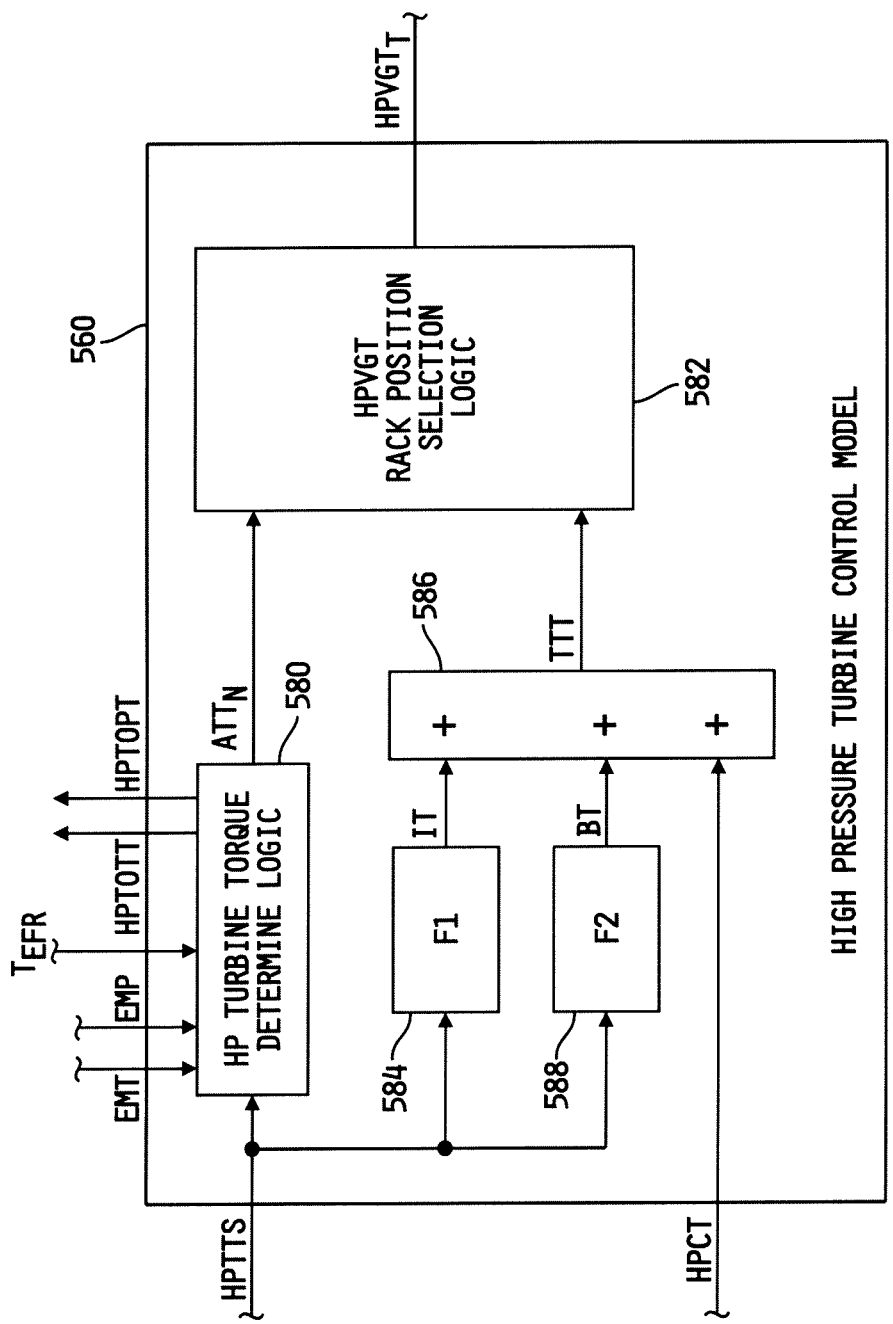
FIG. 19 is a block diagram of one illustrative embodiment off the high-pressure turbine control model illustrated in FIG. 18.

Referring now to FIG. 19, one illustrative embodiment of the high-pressure turbine control model 560 illustrated in FIG. 18 is shown. In the illustrated embodiment, the high-pressure turbine model 560 includes a high-pressure turbine torque determination logic block 580 receiving as inputs the high-pressure target turbocharger speed value, HPTTS, produced by the high-pressure compressor model 166, the target exhaust manifold temperature, EMT, and the target exhaust manifold pressure, EMP, produced by the cylinder model 168, and a target exhaust flow rate value, TEFR. Illustratively, TEFR may be determined as a conventional function of the target exhaust manifold temperature, EMT, and/or as a function of the target exhaust manifold pressure, EMP, produced by the cylinder model 168, and/or as a function of the target charge flow rate, TCHFR, and the target EGR flow rate, TEGRFR, produced by the combustion parameter to air handling reference generation model 160. In any case, the high-pressure turbine torque determination logic 580 is operable to process HPTTS, TEFR, EMT and EMP and produce a number, N, of available turbine torque values, $ATT_N$, wherein each of the N ATT values corresponds to an available turbine torque at a different one of N possible rack positions of the high-pressure turbine 34, i.e., $ATT_1$ corresponds to an available turbine torque at rack position 1, $ATT_2$ corresponds to a different available turbine torque at rack position 2, etc.

Figure 20:
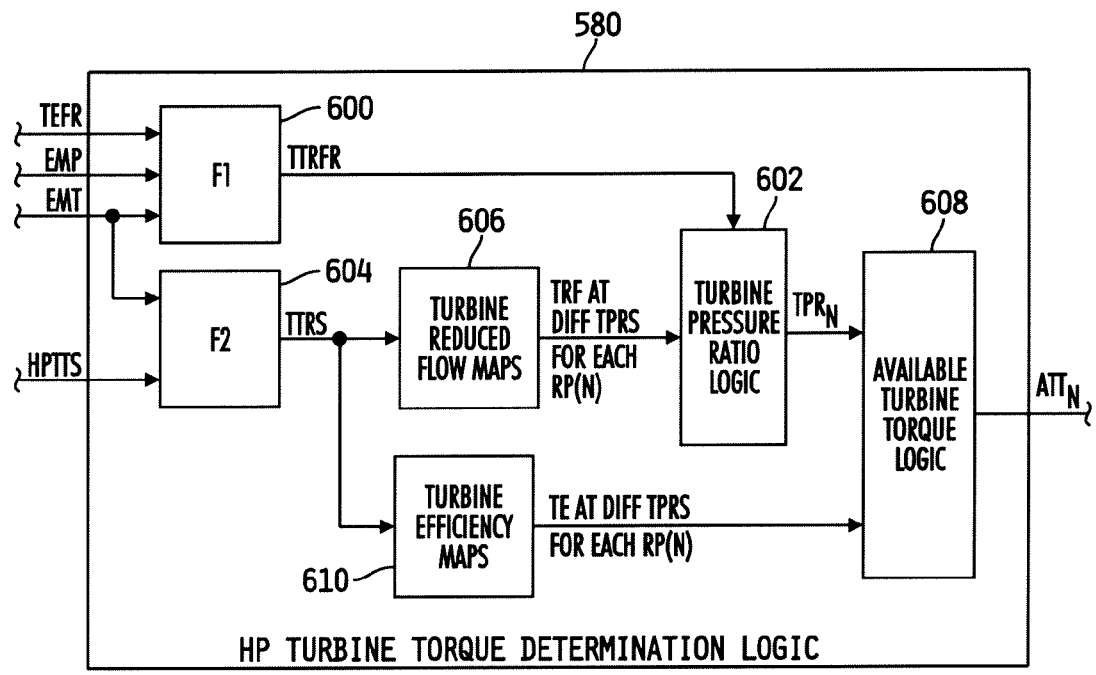
FIG. 20 is a block diagram of one illustrative embodiment of the high-pressure turbine torque determination logic block illustrated in FIG. 19.

Referring now to FIG. 20, one illustrative embodiment of the high-pressure turbine torque determination logic block 580 illustrated in FIG. 19 is shown. In the illustrated embodiment, the high-pressure turbine torque determination logic block 580 includes a function block 600 receiving as inputs the target exhaust flow rate, TEFR, the target exhaust manifold pressure, EMP, and the target exhaust manifold temperature, EMT, and producing as an output a target turbine reduced flow rate, TTRFR. Illustratively, the function, F1, stored in the function block 202 produces TTRFR in accordance with the equation TTRFR=TEFR*SQRT(EMT)/EMP. The high-pressure turbine torque determination logic block 580 further includes another function block 604 receiving as inputs the target exhaust manifold temperature, EMT, and the high-pressure target turbocharger speed, HPTTS, and produces as an output a target turbine reduced speed, TTRS. Illustratively, the function, F2, stored in the function block 604 produces TTRS in accordance with the equation TTRS=HPTTS/SQRT(EMT). Alternatively, this disclosure contemplates other embodiments in which F1 and/or F2 includes more, fewer and/or different input parameters.

The target turbine reduced speed, TTRS, is provided as an input to another functional block 606 that illustratively has stored therein N conventional turbine reduced flow maps corresponding to the specific configuration of the turbocharger 18. Generally, each of the turbine reduced flow maps is designed to map, for a different rack position, TTRS to turbine reduce flow rate values, TRF, at a plurality of different turbine pressure ratios (TPRS). The functional block 606 is illustratively operable to process TTRS using the N turbine reduced flow maps to generate for each rack position a number of pairs of turbine reduced flow and turbine pressure ratio values.

Figure 21:
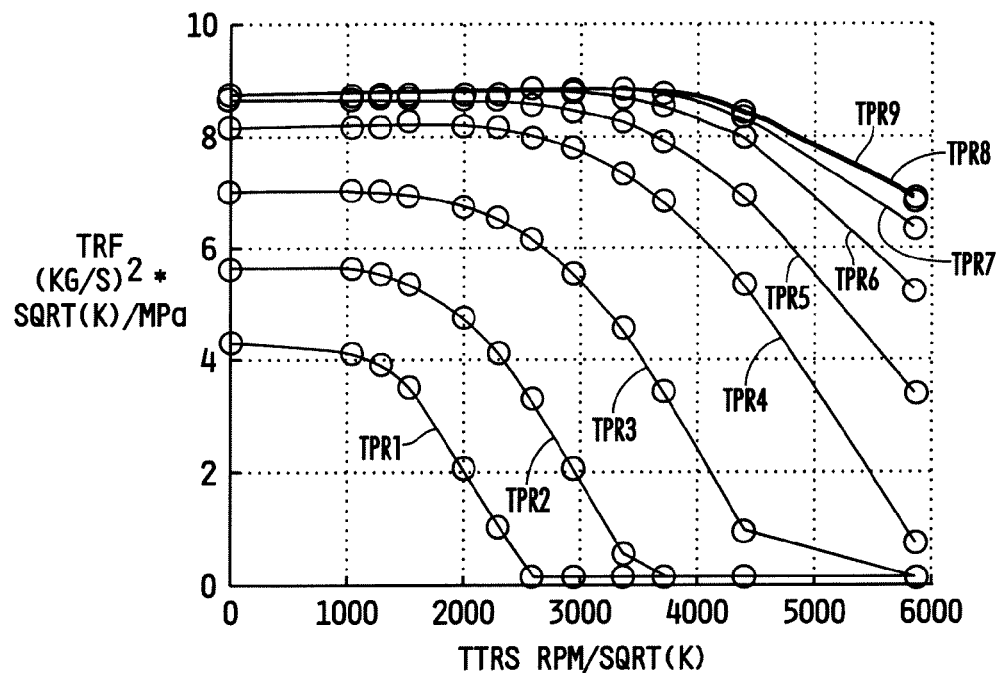
FIG. 21 is a plot of one illustrative example of one of the turbine reduced flow maps illustrated in FIG. 20.

Referring now to FIG. 21, an example of one such turbine reduced flow map is shown for one example rack position of the high-pressure variable geometry turbine 34. In the illustrated embodiment, the turbine reduced flow map maps target turbine reduced speed values, TTRS, to turbine reduced flow values, TRF, at a plurality of different turbine pressure ratios, where the contours $TPR_1$-$TPR_9$ represent lines of different, constant turbine pressure ratios. With the turbine reduced flow map, any one value of TTRS thus produces a number, M, of different turbine reduced flow, TRF, and turbine pressure ratio, TPR, pairs $(TRF, TPR)_1, \ldots, (TRF, TPR)_M$, where M may be any positive integer.

Referring again to FIG. 20, the target turbine reduced flow rate, TTRFR, produced by the functional block 600 and the number of pairs of turbine reduced flow and turbine pressure ratio values, $(TRF, TPR)_{1-M}$, produced by the functional block 606 are provided as inputs to another functional block 602. The functional block 602 illustratively processes a function of at least two of the $(TRF, TPR)_{1-M}$ pair values and the TTRFR value to produce a number, N, of turbine pressure ratios; one for each of the N different rack positions of the high-pressure turbine 34. In one embodiment, for example, for each different rack position two of the $(TRF, TPR)_{1-M}$ pair values are selected with one pair having a TRF value that is less than TTRFR and the other pair having a TRF value that is greater than TTRFR, and a conventional interpolation technique is used to determine a TPR value that corresponds to TRF for that rack position. In embodiments in which the function of the two $(TRF, TPR)_{1-M}$ pair values is linear, or can be acceptably approximated by a linear function, a conventional linear interpolation technique may be used to determine the N TPR values. Alternatively, in embodiments in which the function of the two $(TRF, TPR)_{1-M}$ pair values is non-linear, a conventional non-linear interpolation technique may be used to determine the N TPR values. Alternatively still, the functional block 606 may be configured to process the number of $(TRF, TPR)_{1-M}$ pair values to generate a continuous or piece-wise continuous profile of TPR values as a function of TRF, and such a profile can be processed as described above with respect to the functional block 522 to determine a TPR for each of the N different rack positions.

The target turbine reduced speed, TTRS, produced by the functional block 604 is also provided as an input to another functional block 610 that illustratively has stored therein a number, N, of conventional turbine efficiency maps corresponding to the specific configuration of the turbocharger 18. Generally, each of the N turbine efficiency maps is designed to map, for each of the N different turbine rack positions of the high-pressure turbine 34, values of TTRS to turbine efficiency (percentage) values at a plurality of different turbine pressure ratio values. The functional block 610 is illustratively operable to process TTRS using the N different turbine efficiency maps to generate for each of the N different rack positions a number of pairs of turbine efficiency and turbine pressure ratio values.

Figure 22:
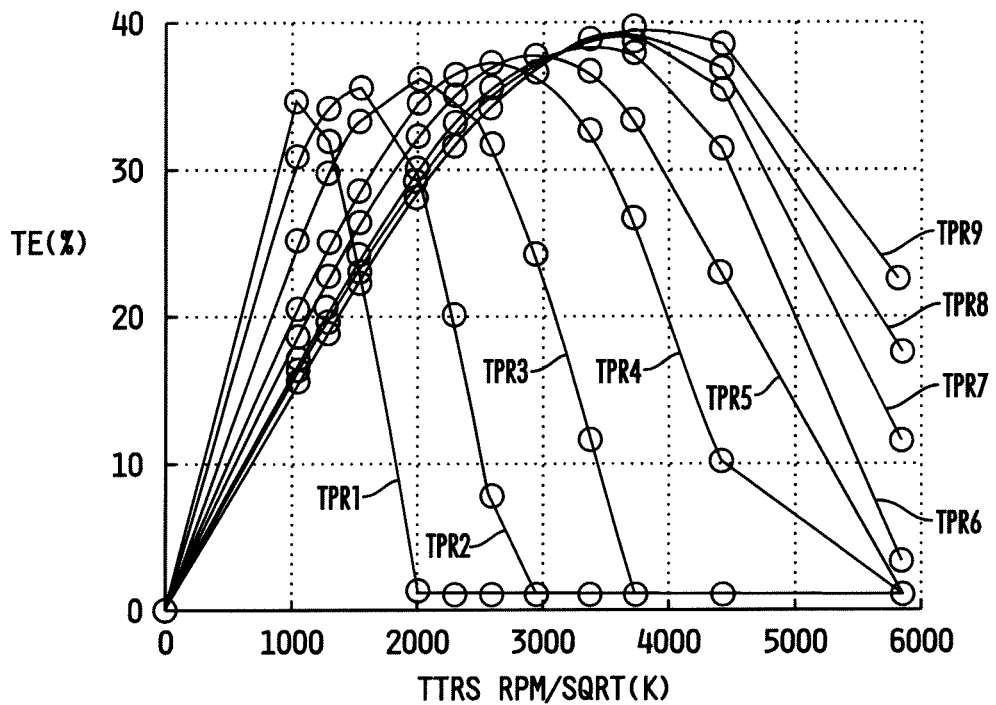
FIG. 22 is a plot of one illustrative example of one of the turbine efficiency maps illustrated in FIG. 20.

Referring now to FIG. 22, an example of one such turbine efficiency map is shown for one example rack position of the high-pressure variable geometry turbine 34. In the illustrated embodiment, the turbine efficiency map maps target turbine reduced speed values, TTRS, to turbine efficiency values, TE, at a plurality of different turbine pressure ratios, where the contours $TPR_1$-$TPR_9$ represent lines of different, constant turbine pressure ratios. With the N turbine efficiency maps, any one value of TTRS thus produces a number, K, of different turbine efficiency, TE, and turbine pressure ratio, TPR, pairs $(TE, TPR)_1, \ldots, (TE, TPR)_K$, for each of the N different rack positions where K may be any positive integer.

Referring again to FIG. 20, the N turbine pressure ratio values, TPR, produced by the functional block 602 and the number of pairs of turbine efficiency and turbine pressure ratio values, $(TE, TPR)_{1-K}$, produced by the functional block 610 for each of the N different rack positions are provided as inputs to another functional block 608. Similarly to the functional block 602, the functional block 608 processes a function of at least two of the $(TE, TPR)_{1-K}$ pair values and the TPR value for each of the N different rack positions to produce an available turbine torque estimate, ATT, for each of the N different turbine rack positions of the high-pressure turbine 34. In one embodiment, for example, for each rack position two of the $(TE, TPR)_{1-K}$ pair values are selected with one pair having a TPR value that is less than the corresponding TPR value produced by the logic block 602 and the other pair having a TPR value that is greater than the TPR value produced by the logic block 602, and a conventional interpolation technique is used to determine a corresponding ATT value. In embodiments in which the function of the two $(TE, TPR)_{1-K}$ pair values is linear, or can be acceptably approximated by a linear function, a conventional linear interpolation technique may be used to determine the ATT values. Alternatively, in embodiments in which the function of the two $(TE, TPR)_{1-K}$ pair values is non-linear, a conventional non-linear interpolation technique may be used to determine the ATT values. Alternatively still, the functional block 608 may be configured to process the number of $(TE, TPR)_{1-K}$ pair values to generate a continuous or piece-wise continuous profile of available turbine torque values as a function of turbine efficiencies, and such a profile can be processed as described above with respect to the functional block 608 to determine ATT values for each of the N different turbine rack positions of the low-pressure turbine 40.

Referring again to FIG. 19, the high-pressure turbine control model 560 further includes a functional block 584 receiving the high-pressure target turbocharger speed, HPTTS, as an input and producing as an output an inertia torque value, IT. Illustratively, IT corresponds to torque associated with the inertia of the rotating turbocharger shaft 32A, and F1 illustratively determines IT as a function of HPTTS. In one illustrative embodiment, for example, F1 computes IT in accordance with the equation IT=I dHPTTS/dt, where I is the inertia associated with the rotation of the turbocharger shaft 32A. Illustratively, I is a constant determined in a conventional manner as a function of the dimensions and structure of the shaft 32A.

Figure 23:
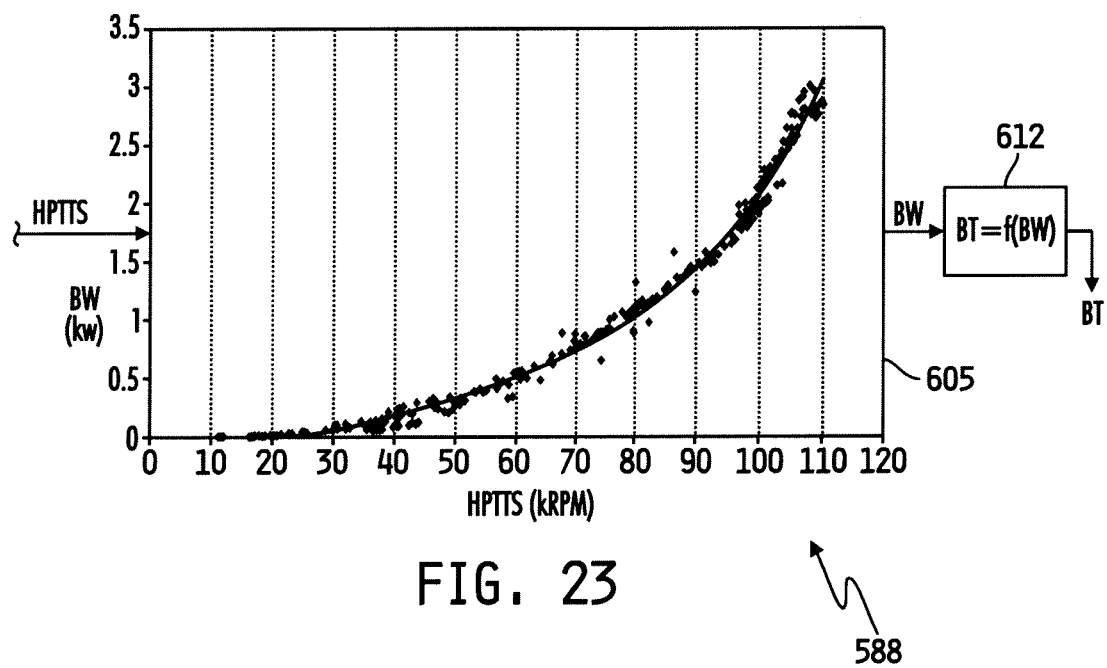
FIG. 23 is a block diagram of one illustrative embodiment and example of the function block F2 illustrated in FIG. 19.

The high-pressure turbine control model 560 further includes another functional block 588 receiving the high-pressure target turbocharger speed, HPTTS, as an input and producing as an output a bearing torque value, BT. Illustratively, BT corresponds to torque associated with the bearing housing of the turbine 34, and F2 illustratively determines BT as a function of HPTTS. Referring to FIG. 23, one illustrative embodiment of the functional block 588 is shown. In the illustrated embodiment, the functional block 588 includes a turbocharger bearing work map 605 that maps the high-pressure target turbine speed, HPTTS, to a bearing work value, BW. The bearing work value, BW, corresponding to the high-pressure target turbine speed, HPTTS, is provided as an input to another functional block 612 that computes the bearing torque value, BT, as a function of the bearing work value, BW, provided by the map 605. In one illustrative embodiment, the functional relationship between BT and BW is given by the relationship $BT=a+b*BW+c*BW^2+d*BW^3$, where a, b, c and d are calibratible constants. It will be understood, however, that this disclosure contemplates other relationships defining BT as a function of BW and/or that define BT as a function of US.

Referring again to FIG. 19, the torque values IT and BT are provided, along with the high-pressure target compressor torque, HPCT, to separate additive inputs of an addition block 586 such that the output of the addition block represents a total target torque, TTT=HPCT+IT+BT, which is required to drive the high-pressure compressor 16 with the high-pressure target compressor torque, HPCT. The total target torque, TTT, is provided as one input to a high-pressure VGT rack position selection logic block 582 and the N available turbine torque values, $ATT_N$, are provided to another input of the block 582. The logic block 582 is generally operable to select in a conventional manner a turbine rack position of the high-pressure turbine 34 that has sufficient available torque to satisfy TTT. The logic block 582 is then operable to produce $HPVGT_T$ to select that turbine rack position.

Figure 24:
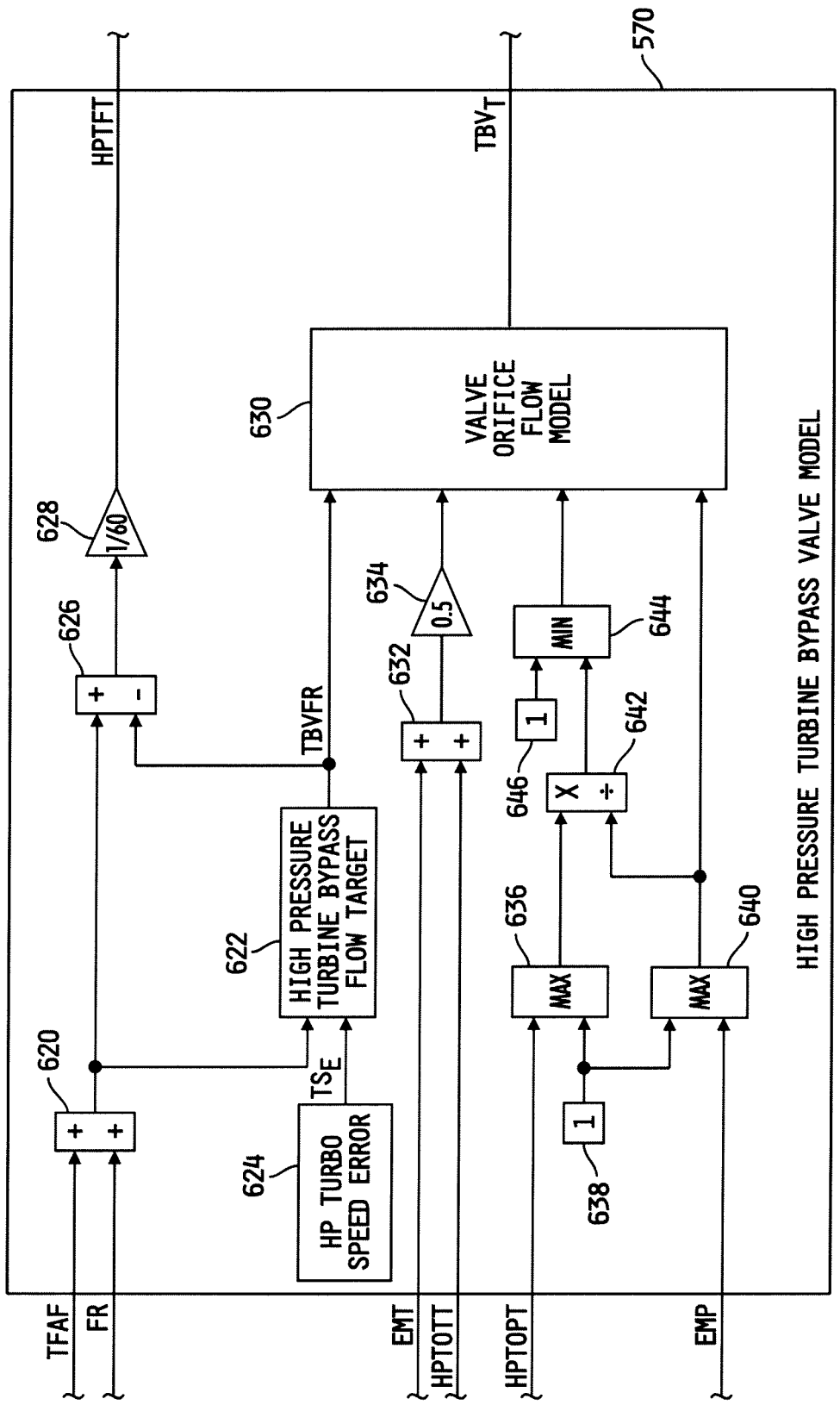
FIG. 24 is a block diagram of one illustrative embodiment of the high-pressure turbine bypass valve model illustrated in FIG. 18.

Referring now to FIG. 24, one illustrative embodiment of the high-pressure turbine bypass valve model 570 of FIG. 18 is shown. In the illustrated embodiment, the high-pressure turbine bypass valve model 570 includes an addition block 620 having one addition input that receives the target fresh air flow rate, TFAF, and another additive input that receives the target fuel rate, FR. The output of the addition block 620 is provided to one input of a high-pressure turbine bypass flow target block 622 and to an addition input of a summation block 626. Another input of the high-pressure turbine bypass flow target block 622 receives an output of a high-pressure turbocharger speed error block 624. Illustratively the high-pressure turbocharger speed error, TSE, produced by the block 624 represents a difference between a target high-pressure turbocharger speed and an actual high-pressure turbocharger speed. In one embodiment, for example, TSE may be computed as a difference between HPTTS and a measured or estimated rotational speed of the high-pressure turbocharger shaft 32A. In any case, TSE and the quantity (TFAF+FR) produced by the addition block 620 are processed by the high-pressure turbine bypass flow target block 622 to produce a target flow rate, TBVFR, through the high-pressure turbine bypass throttle 48, the output of which is provided to a subtraction input of the summation block 626 and to one input of a valve orifice flow model block 630. In one embodiment, the high-pressure turbine bypass flow target block 622 is configured to compute TBVFR according to the relationship TBVFR=MAX{0, MIN[1, (a*TSE+b*TSE$^2$+c*TSE$^3$)]}*(TFAF+FR), where a, b, and c are calibratible constants. It will be understood, however, that this disclosure contemplates that TBVFR may alternatively be computed in accordance with a 2-dimensional table or other model, and/or by using more, fewer and/or different parameters. In any case, the difference between the quantity (TFAF+FR) produced by the addition block 620 and TBVFR produced by the block 622 is the output of the summation block 626 which is passed through a multiplication block 628 to produce the high-pressure turbocharger flow target, HPTFT. In the illustrated embodiment, HPTFT is thus computed as HPTFT=[(TFAF+FR)−TBVFR]/60.

The target exhaust manifold temperature, EMT, is provided to one addition input of a summation node 632, and the high-pressure target outlet temperature, HPTOTT, is provided to another addition input of the summation node 632, and the output of the node 632 is passed through a multiplication block 634 to another input of the valve orifice flow model 630. In the illustrated embodiment, the output of the multiplication block 634 is (EMT+HPTOTT)/2.

The high-pressure turbine outlet pressure target, HPTOPT, is provided to one input of a MAX block 636, which has another input receiving the constant 1 stored in a memory location 638. The constant 1 stored in the memory location 638 is also provided to one input of another MAX block 640 having another input receiving the target exhaust manifold pressure, EMP. The output of the MAX block 636 is provided to a multiplication input of an arithmetic block 642 and the output of the MAX block 640 is provided to a division input of the arithmetic block 642. The output of the arithmetic block 642 is provided to one input of another MAX block 644 having another input receiving the constant 1 stored in a memory location 646. The outputs of the MIN block 644 and MAX block 640 are both provided as inputs to the valve orifice flow model 630. The output of the MIN block 642 is MIN(1, HPTOPT/EMP), wherein HPTOT and EMP are both bounded on the low side by 1. The output of the MAX block 640 is MAX(1, EMP). The output of the valve orifice flow mode 630 is the feedfonNard or target component, $TBV_T$ of the high-pressure turbine bypass valve control signal, TBV, produced by the control circuit 60. Illustratively, the valve orifice flow model 630 is a conventional model which computes the flow orifice size of the high-pressure turbine bypass valve 48 as a function of TBVFR, (EMT+HPTOTT)/2, MIN (1, HPTOPT/EMP) and MAX(1, EMP), and which then converts the computed flow orifice size to a target control value, $TBV_T$, which can be applied to the actuator of the valve 48 to achieve the computed flow orifice size. The MIN/MAX operations accomplished by blocks 636, 640 and 644 ensure that the feedforward or target component, $TBV_T$, of the high-pressure turbine bypass valve control signal, TBV, corresponds to a flow orifice size of the high-pressure turbine bypass valve 48 that is between 0% and 100%.

Figure 25:
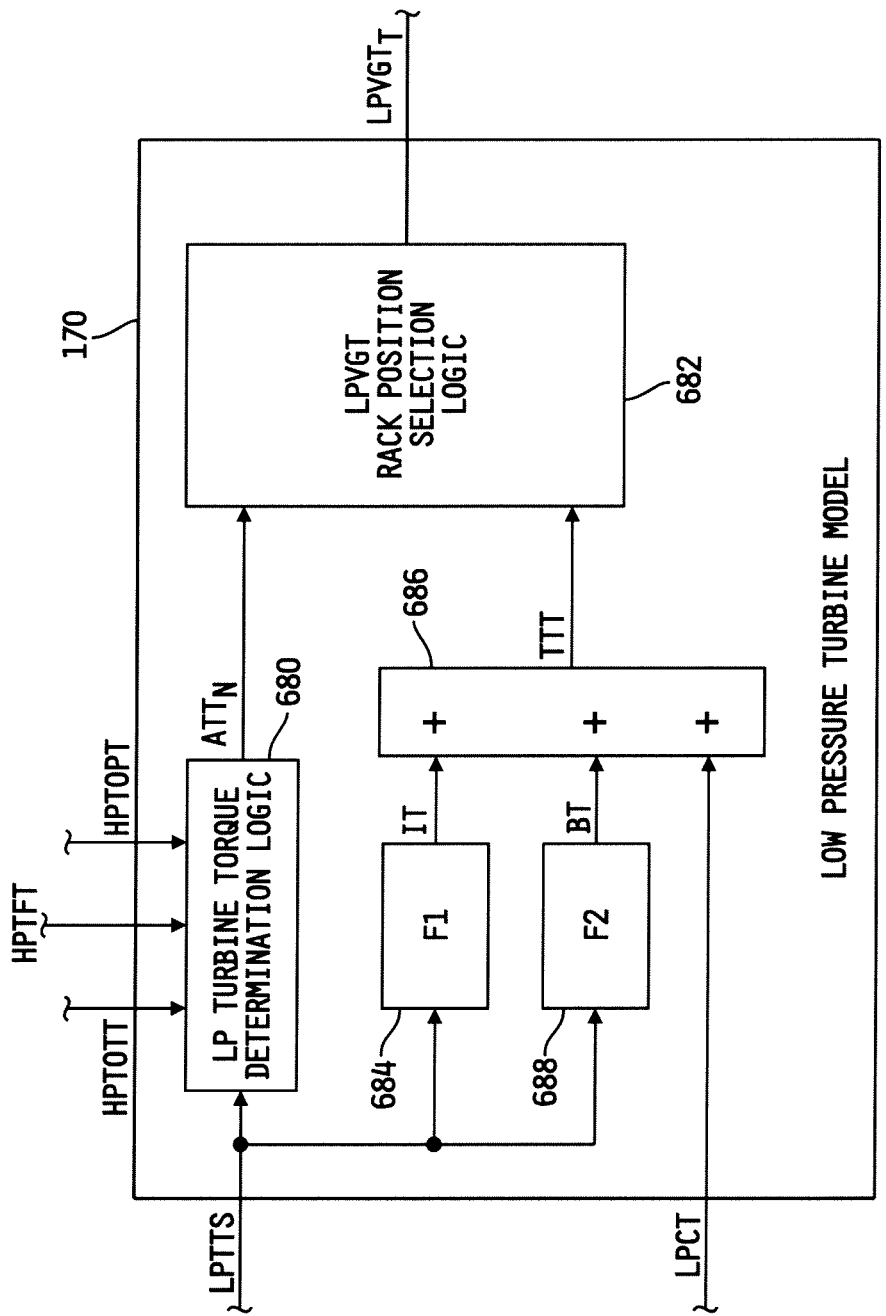
FIG. 25 is a block diagram of one illustrative embodiment of the low-pressure turbine model illustrated in FIG. 4.

Referring now to FIG. 25, one illustrative embodiment of the low-pressure turbine flow model 170 of FIG. 4 is shown. The low-pressure turbine model 166 is illustratively identical to the high-pressure turbine control model 560 illustrated in FIGS. 19-23, except that the low-pressure turbine torque determination block 680 does not produce outlet temperature and pressure targets, and instead of HPTTS, EMT, EMP and TEFR, the low-pressure turbine torque determination logic receives as inputs the low-pressure target turbocharger speed, LPTTS, the high-pressure turbine outlet temperature target, HPTOTT, the high-pressure turbine outlet pressure target, HPTOPT, and the high-pressure turbine flow target, HPTFT, respectively. The function blocks 684 and 688 likewise receive LPTTS instead of HPTTS, and the addition block 686 receives as its third input LPCT rather than HPCT. The low-pressure turbine model 170 also computes the various intermediate values in accordance with the particular geometry of the low-pressure turbine 40, and otherwise the low-pressure turbine model 170 is identical to the high-pressure turbine control model 560. Blocks 680, 682, 684, 686 and 688 are thus identical or otherwise identical to blocks 580, 582, 584, 586 and 588 of FIGS. 19-23. The output of the low-pressure turbine model of FIG. 25 is accordingly the feedforward value, $HPVGT_T$, of the high-pressure variable geometry turbocharger control value, HPVGT, produced by the control circuit 60.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:
1. An air handling system for an internal combustion engine, comprising:
   a dual stage turbocharger including a high-pressure turbine having an exhaust gas inlet fluidly coupled to an exhaust manifold of the engine and an exhaust gas outlet, and a low-pressure turbine having an exhaust gas inlet fluidly coupled to the exhaust gas outlet of the high-pressure turbine and an exhaust gas outlet fluidly coupled to ambient, a turbine bypass passageway having one end fluidly coupled to the exhaust gas inlet of the high-pressure turbine and an opposite end fluidly coupled to the exhaust gas outlet of the high-pressure turbine, a turbine bypass throttle disposed in-line with the turbine bypass passageway, the turbine bypass throttle controllable between fully closed and fully open positions to control a flow of exhaust gas through the turbine bypass passageway, and a control circuit including a memory having instructions stored therein that are executable by the control circuit to determine a turbine bypass control signal as a function of a target flow rate of exhaust gas through the turbine bypass throttle, a target temperature of the exhaust manifold and a target outlet temperature of the high pressure turbine, and to control a position of the turbine bypass throttle between the fully closed and fully open positions using the turbine bypass control signal to selectively divert exhaust gas flow from the exhaust manifold away from the exhaust gas inlet of the high-pressure turbine.

2. The air handling system of claim 1 wherein the instructions stored in the memory further include instructions executable by the control circuit to determine the target flow rate of exhaust gas through the turbine bypass throttle as a function of a speed error corresponding to a difference between a target and an actual or estimated rotational speed of the high pressure turbine, a target flow rate of fresh air flow into the turbocharger and a target fuel rate of the engine.

3. The air handling system of claim 2 wherein the instructions stored in the memory further include instructions executable by the control circuit to determine the turbine bypass control signal further as a function of a target pressure within the exhaust manifold and a target outlet pressure of the high pressure turbine.

4. The air handling system of claim 3 wherein the instructions stored in the memory further include instructions executable by the control circuit to determine the turbine bypass control signal by computing a target flow orifice size of the turbine bypass throttle as a function of the target flow rate of exhaust gas through the turbine bypass throttle, the target temperature of the exhaust manifold, the target outlet temperature of the high pressure turbine, the target pressure within the exhaust manifold and the target outlet pressure of the high pressure turbine, and then converting the target flow orifice size of the turbine bypass throttle to the turbine bypass control signal.

5. The air handling system of claim 1 wherein the instructions stored in the memory further include instructions executable by the control circuit to determine the turbine bypass control signal further as a function of a target pressure within the exhaust manifold and a target outlet pressure of the high pressure turbine.

6. An air handling system for an internal combustion engine, comprising:

a dual stage turbocharger including a low-pressure compressor rotatably coupled to a low-pressure variable geometry turbine, the low-pressure compressor having an air inlet fluidly coupled to ambient and an air outlet, and a high-pressure compressor rotatably coupled to a high-pressure variable geometry turbine, the high-pressure compressor having an air inlet fluidly coupled to the air outlet of the low-pressure compressor and an air outlet fluidly coupled to an intake manifold of the engine, a low-pressure turbine actuator responsive to a low-pressure variable geometry turbine control signal to control a geometry of the low-pressure variable geometry turbine, a high-pressure turbine actuator responsive to a high-pressure variable geometry turbine control signal to control a geometry of the high-pressure variable geometry turbine, and a control circuit including a memory having instructions stored therein that are executable by the control circuit to determine a target low-pressure compressor ratio, a target high-pressure compressor ratio, a target high-pressure compressor inlet temperature and a target high-pressure compressor inlet pressure as a function of a target outlet pressure of the high-pressure compressor and a temperature, a pressure and a target flow rate of air entering the air inlet of the low-pressure compressor, to produce the low-pressure variable geometry turbine control signal as a function of the target low-pressure compressor ratio and to produce the high-pressure variable geometry turbine control signal as a function of the target high-pressure compressor ratio, the target high-pressure compressor inlet temperature and a target high-pressure compressor inlet pressure.

7. The air handling system of claim 6 wherein the instructions stored in the memory further include instructions executable by the control circuit to determine an initial target low-pressure compressor ratio and a target low-pressure compressor outlet temperature as a function of the target flow rate, temperature and pressure of air entering the air inlet of the low-pressure compressor, to compute an unadjusted high-pressure compressor ratio target as a function of the target outlet pressure of the high-pressure compressor, the initial target low-pressure compressor ratio and the pressure of air entering the air inlet of the low-pressure compressor, to compute a temperature-based high-pressure compressor ratio target as a function of the target low-pressure compressor outlet temperature, and to determine the target low-pressure compressor ratio to be the initial target low-pressure compressor ratio if the temperature-based high-pressure compressor ratio target is equal to the unadjusted high-pressure compressor ratio target.

8. The air handling system of claim 7 wherein the instructions stored in the memory further include instructions executable by the control circuit to correct the target low-pressure compressor ratio for altitude as a function of ambient pressure to which the engine is exposed.

9. The air handling system of claim 7 wherein the instructions stored in the memory further includes instructions executable by the control circuit to determine the target high-pressure compressor ratio to be the temperature-based high-pressure compressor ratio target.

10. The air handling system of claim 7 wherein the instructions stored in the memory further include instructions executable by the control circuit to compute a modified target low-pressure compressor ratio target as a function of the temperature-based high-pressure compressor ratio target, the target high-pressure compressor outlet pressure and the pressure of air entering the air inlet of the low-pressure compressor, and to determine the target low-pressure compressor ratio to be the modified target low-pressure compressor ratio if the temperature-based high-pressure compressor ratio target is not equal to the unadjusted high-pressure compressor ratio target.

11. The air handling system of claim 10 wherein the instructions stored in the memory further include instructions executable by the control circuit to correct the target low-pressure compressor ratio for altitude as a function of ambient pressure to which the engine is exposed.

12. The air handling system of claim 10 wherein the instructions stored in the memory further includes instructions executable by the control circuit to determine the target high-pressure compressor ratio to be the temperature-based high-pressure compressor ratio target.

13. The air handling system of claim 6 further comprising an inter-stage cooler interposed between and fluidly coupled to the air outlet of the low-pressure compressor and the air inlet of the high-pressure compressor.

14. The air handling system of claim 13 wherein the instructions stored in the memory further include instructions executable by the control circuit to determine an initial target low-pressure compressor ratio and a target low-pressure compressor outlet temperature as a function of the target flow rate, temperature and pressure of air entering the air inlet of the low-pressure compressor, to determine a target pressure ratio and a target outlet temperature of the inter-stage cooler as a function of the initial target low-pressure compressor ratio, the target low-pressure compressor outlet temperature, the target flow rate and pressure of air entering the inlet of the low-pressure compressor, to compute an unadjusted high-pressure compressor ratio target as a function of the target outlet pressure of the high-pressure compressor, the initial target low-pressure compressor ratio, the target pressure ratio of the inter-stage cooler and the pressure of air entering the air inlet of the low-pressure compressor, to compute a temperature-based high-pressure compressor ratio target as a function of the target outlet temperature of the inter-stage cooler, and to determine the target low-pressure compressor ratio to be the initial target low-pressure compressor ratio if the temperature-based high-pressure compressor ratio target is equal to the unadjusted high-pressure compressor ratio target.

15. The air handling system of claim 14 wherein the instructions stored in the memory further include instructions executable by the control circuit to correct the target low-pressure compressor ratio for altitude as a function of ambient pressure to which the engine is exposed.

16. The air handling system of claim 14 wherein the instructions stored in the memory further includes instructions executable by the control circuit to determine the target high-pressure compressor ratio to be the temperature-based high-pressure compressor ratio target.

17. The air handling system of claim 14 wherein the instructions stored in the memory further include instructions executable by the control circuit to compute a modified target low-pressure compressor ratio target as a function of the temperature-based high-pressure compressor ratio target, the target high-pressure compressor outlet pressure, the pressure of air entering the air inlet of the low-pressure compressor and the target pressure ratio of the inter-stage cooler, and to determine the target low-pressure compressor ratio to be the modified target low-pressure compressor ratio if the temperature-based high-pressure compressor ratio target is not equal to the unadjusted high-pressure compressor ratio target.

18. The air handling system of claim 17 wherein the instructions stored in the memory further include instructions executable by the control circuit to correct the target low-pressure compressor ratio for altitude as a function of ambient pressure to which the engine is exposed.

19. The air handling system of claim 17 wherein the instructions stored in the memory further includes instructions executable by the control circuit to determine the target high-pressure compressor ratio to be the temperature-based high-pressure compressor ratio target.

20. The air handling system of claim 14 wherein the instructions stored in the memory further include instructions executable by the control circuit to determine the target outlet temperature of the inter-stage cooler as a function of the target low-pressure compressor outlet temperature, the target flow rate of air entering the inlet of the low-pressure compressor and ambient temperature to which the engine is exposed.

* * * * *